United States Patent
Mueller et al.

(10) Patent No.: US 11,883,828 B2
(45) Date of Patent: Jan. 30, 2024

(54) PROCESS FOR TREATING CONSTRUCTION AND DEMOLITION WASTE MATERIAL WITH KINETIC PULVERIZATION

(71) Applicant: TORXX KINETIC PULVERIZER LIMITED, Hamilton (BM)

(72) Inventors: Christopher Mueller, King (CA); Michael Drolet, Hamilton (BM); Peter Everson, Hamilton (BM); Terri Ward, Hamilton (BM)

(73) Assignee: TORXX KINETIC PULVERIZER LIMITED, Hamilton (BM)

( * ) Notice: Subject to any disclaimer, the term of this patent is extended or adjusted under 35 U.S.C. 154(b) by 0 days.

(21) Appl. No.: 17/994,104

(22) Filed: Nov. 25, 2022

(65) Prior Publication Data

US 2023/0101815 A1    Mar. 30, 2023

Related U.S. Application Data

(63) Continuation of application No. PCT/CA2022/051016, filed on Jun. 23, 2022.

(30) Foreign Application Priority Data

Jun. 25, 2021  (CA) .................................... 3123240
Jan. 7, 2022   (CA) .................................... 3145069

(51) Int. Cl.
*B02C 13/00*    (2006.01)
*B02C 7/02*     (2006.01)
(Continued)

(52) U.S. Cl.
CPC ............... *B02C 7/02* (2013.01); *B02C 13/14* (2013.01); *B02C 13/18* (2013.01); *B02C 23/08* (2013.01); *B02C 23/10* (2013.01); *B09B 3/35* (2022.01)

(58) Field of Classification Search
CPC ......... B02C 13/18; B02C 13/08; B02C 13/10; B02C 13/14; B02C 13/284; B02C 7/02; B02C 23/08; B09B 3/35
See application file for complete search history.

(56) References Cited

U.S. PATENT DOCUMENTS 1,178,386 A    4/1916    Edwards
1,479,541 A    1/1924    Hirsch
(Continued)

FOREIGN PATENT DOCUMENTS

CA    2165636    6/1996
CA    2147666    10/1996
(Continued)

*Primary Examiner* — Faye Francis
(74) *Attorney, Agent, or Firm* — Barnes & Thornburg LLP

(57) ABSTRACT

The present disclosure relates to the treatment of streams derived from construction and/or demolition (C&D) debris, such as C&D fines streams, asphalt shingles, drywall, or wood. The process can include a kinetic pulverization stage through a kinetic pulverizer where the frangible materials are size-reduced and the ductile materials are liberated and remain as an oversized fraction. The feedstock can include infrangible materials that also remains as an oversized fraction. The pulverized material is then subjected to a separation stage, which may include mechanical and/or magnetic screening, to separate the oversized material comprising the ductile material, and optionally larger particles of the infrangible material, from the size-reduced material comprising the frangible material, and optionally small particles of infrangible material.

30 Claims, 16 Drawing Sheets

(51) Int. Cl.
*B09B 3/35* (2022.01)
*B02C 13/14* (2006.01)
*B02C 13/18* (2006.01)
*B02C 23/08* (2006.01)
*B02C 23/10* (2006.01)

(56) References Cited

U.S. PATENT DOCUMENTS

| | | | |
|---|---|---|---|
| 1,636,033 A | 7/1927 | Agnew | |
| 2,125,797 A | 8/1938 | Marino | |
| 2,147,666 A | 2/1939 | Park | |
| 3,065,919 A | 11/1962 | Burkett | |
| 3,160,354 A | 12/1964 | Burkett | |
| 3,381,904 A | 5/1968 | Glidden | |
| 3,834,632 A | 9/1974 | Docksteader | |
| 3,987,970 A | 10/1976 | Burkett | |
| 4,146,185 A | 3/1979 | Schober | |
| 4,529,134 A | 7/1985 | Williams | |
| 4,690,338 A | 9/1987 | Sayler et al. | |
| 4,749,133 A | 6/1988 | Sayler et al. | |
| 4,789,105 A * | 12/1988 | Hosokawa | B01J 2/12 241/119 |
| 4,867,866 A | 9/1989 | Mayberry | |
| 4,988,045 A | 1/1991 | Griesedieck | |
| 5,192,029 A | 3/1993 | Harris et al. | |
| 5,285,973 A | 2/1994 | Goforth et al. | |
| 5,395,061 A | 3/1995 | Merklinger | |
| 5,525,153 A * | 6/1996 | Cosola | C04B 18/16 106/737 |
| 5,551,909 A | 9/1996 | Bailey | |
| 5,680,994 A | 10/1997 | Eide et al. | |
| 5,732,894 A | 3/1998 | Sheahan | |
| 5,772,134 A | 6/1998 | Bouldin et al. | |
| 5,820,044 A | 10/1998 | Greco | |
| 5,865,381 A | 2/1999 | Mitsumura et al. | |
| 5,881,959 A | 3/1999 | Hadjinian et al. | |
| 6,129,297 A | 10/2000 | Sawant et al. | |
| 6,325,306 B1 | 12/2001 | Gacanich et al. | |
| 6,499,678 B1 | 12/2002 | Hope | |
| 7,124,968 B2 | 10/2006 | Oder et al. | |
| 7,222,805 B1 | 5/2007 | Williams | |
| 7,497,394 B2 | 3/2009 | Muther et al. | |
| 7,815,729 B2 * | 10/2010 | Cummings | C04B 28/02 106/713 |
| 8,517,294 B2 | 8/2013 | Yamamoto et al. | |
| 8,919,681 B1 * | 12/2014 | Horton | C10C 3/007 241/24.1 |
| 8,931,721 B2 | 1/2015 | Jenson et al. | |
| 9,156,035 B1 * | 10/2015 | Horton | B03B 9/065 |
| 9,192,940 B2 | 11/2015 | Muther | |
| 9,205,431 B2 | 12/2015 | Anderson | |
| 9,440,239 B1 * | 9/2016 | Horton | C10C 3/007 |
| 9,879,195 B2 | 1/2018 | Bai | |
| 10,799,873 B2 * | 10/2020 | Yunger | B02C 18/12 |
| 10,807,097 B2 * | 10/2020 | Mogan | B02C 13/28 |
| 2002/0117564 A1 | 8/2002 | Hahn et al. | |
| 2006/0124787 A1 | 6/2006 | Schweiger et al. | |
| 2008/0041993 A1 | 2/2008 | Hall et al. | |
| 2009/0250538 A1 | 10/2009 | Schmitz et al. | |
| 2010/0140384 A1 | 6/2010 | Webb | |
| 2010/0327096 A1 | 12/2010 | Watts | |
| 2012/0119003 A1 | 5/2012 | Watts | |
| 2014/0077009 A1 | 3/2014 | Watts et al. | |
| 2014/0166795 A1 | 6/2014 | Mogan et al. | |
| 2015/0034747 A1 | 2/2015 | Watts et al. | |
| 2015/0082563 A1 | 3/2015 | Semrau et al. | |
| 2016/0045919 A1 | 2/2016 | Mcdaniel et al. | |
| 2016/0144371 A1 | 5/2016 | Sontag | |
| 2017/0361330 A1 | 12/2017 | Smith et al. | |
| 2018/0015478 A1 | 1/2018 | Yunger et al. | |
| 2019/0001336 A1 | 1/2019 | Lutoslawski et al. | |
| 2019/0001337 A1 | 1/2019 | Lutoslawski | |

FOREIGN PATENT DOCUMENTS

| | | | | |
|---|---|---|---|---|
| CA | 2963654 | | 4/2016 | |
| CA | 3056107 | | 1/2017 | |
| CA | 2970375 | | 12/2017 | |
| CA | 2963651 | | 7/2018 | |
| CA | 2963657 | | 7/2018 | |
| CA | 3077199 | | 7/2018 | |
| CA | 3102646 | | 7/2018 | |
| CA | 3104554 | | 1/2020 | |
| CN | 103934085 | | 7/2014 | |
| CN | 105214798 | | 1/2016 | |
| CN | 105833944 | | 8/2016 | |
| CN | 108176488 A * | 6/2018 | ............ B02C 13/18 |
| CN | 111790726 A * | 10/2020 | ............ B02C 23/14 |
| CN | 112452443 A * | 3/2021 | ............ B02C 23/12 |
| DE | 102012104031 | | 11/2013 | |
| EP | 0525302 | | 10/1994 | |
| GB | 2202463 | | 9/1988 | |
| KR | 100810161 B1 * | 3/2008 | ............ B02C 23/08 |
| WO | WO 2020/010469 | | 1/2020 | |

* cited by examiner

PROCESS FOR TREATING CONSTRUCTION AND DEMOLITION WASTE MATERIAL WITH KINETIC PULVERIZATION

CROSS REFERENCE TO RELATED APPLICATIONS

This application is a Continuation of International Application No. PCT/CA2022/051016, filed Jun. 23, 2022, which claims priority to Canada Patent Application Nos. 3,123,240, filed Jun. 25, 2021, and U.S. Pat. No. 3,145,069 filed Jan. 7, 2022. The disclosures set forth in each of the referenced applications is incorporated herein by reference in its entirety.

TECHNICAL FIELD

The technical field generally relates to processing construction and demolition waste materials for size reduction and related processing.

BACKGROUND

Waste from construction and/or demolition projects can be handled and processed in certain facilities, but there are various challenges with dealing with these materials.

Conventional treatments of mixed construction and/or demolition (C&D) debris include manually pre-sorting the material to remove large or visible valuable components (e.g., large pieces of lumber, large pieces of scrap metal, etc.). Small particulates that are screened from the oversized material or generated during the sorting process result in a rough fines product, sometimes referred to as "C&D fines" or "recovered screen material" (RSM). A common reuse strategy for RSM has been as a soil replacement, such as alternative daily landfill cover (ADC). However, one of the challenges with using RSM in soil replacement is the heterogeneity of the material, with large particulates (maximum size depending on the specific screen diameter but is typically in the range of minus 1.5 inches to 3 inches) that can impact structural properties and is considered unappealing for applications where the material may be visible. Furthermore, some RSM products often contain some quantity of sulfate from gypsum drywall, which can be converted to hydrogen sulfide ($H_2S$) in anaerobic environments. $H_2S$ is a gas that is often associated with a rotten egg smell and emissions are not desirable. Accordingly, RSM products are increasingly being banned from use as an ADC due to associated hazards and smell associated with $H_2S$ production.

Another conventional treatment of C&D debris includes source separation of valuable building materials, such as asphalt shingles, and drywall, and processing these valuable materials using grinders or crushers. The grinder or crusher size-reduce the entire feed stream, which includes the asphalt or gypsum components and the paper or plastic underlayer film, resulting in a mixed size-reduced product. Furthermore, when grinders or crushers are used to process asphalt shingles, heat is generated during the size reduction process, which can require the addition of cold water to prevent the asphalt on the shingles from becoming sticky and/or burnt, thus impairing the functioning of the grinder or degrading the quality of the final product.

Accordingly, there are various challenges associated with the current treatments of C&D debris.

SUMMARY

In accordance with some aspects, there is provided a process for treating construction and/or demolition (C&D) debris comprising: providing a C&D fines stream comprising a frangible material and a ductile material; subjecting the C&D fines streams to a kinetic pulverization stage wherein the C&D fines stream is fed into a kinetic pulverizer and subjected to self-collisions created by vortices within the kinetic pulverizer to produce a pulverized material comprising a size-reduced fraction derived from the frangible material and an oversized fraction derived from the ductile material; withdrawing the pulverized material from the kinetic pulverizer; and subjecting the pulverized material to a separation stage to produce a size-reduced stream and an oversized stream.

In some embodiments, the C&D fines stream comprises material below 2 inches or below 4 inches in size.

In some embodiments, the kinetic pulverizer is operated at a rotation speed between 500 RPM to 1,200 RPM.

In some embodiments, the kinetic pulverizer is operated at a rotation speed between 700 RPM and 1,000 RPM.

In some embodiments, the kinetic pulverizer is operated such that the size-reduced fraction is substantially sand or silt sized particles.

In some embodiments, the C&D fines stream has a moisture content of less than 50% upon entry into the kinetic pulverizer.

In some embodiments, the C&D fines stream has a moisture content between 5% and 30% upon entry into the kinetic pulverizer.

In some embodiments, the C&D fines stream is fed directly to the kinetic pulverization stage without a drying stage or a surface wetting stage.

In some embodiments, the C&D fines stream is fed directly to the kinetic pulverization stage at a construction site or a demolition site where the construction and/or demolition debris is generated.

In some embodiments, the process further comprises subjecting the C&D fines stream to a drying stage or a surface wetting pre-treatment stage upstream of the kinetic pulverization stage.

In some embodiments, the size-reduced fraction is a homogeneous mixture in the pulverized output stream.

In some embodiments, the kinetic pulverization stage effects water removal on the C&D fines stream such that the water removal is between 5% and 8% in the kinetic pulverization stage.

In some embodiments, the process further comprises incorporating a friable additive into the C&D fines stream such that the friable additive is size reduced and is homogenized with the frangible material to form part of the size-reduced fraction.

In some embodiments, the friable additive comprises at least one of: a porosity agent, a soil additive, a building material additive, a compost additive, peat moss, a glass product additive, and a recycled concrete aggregate (RCA).

In some embodiments, the friable additive is introduced into the C&D fines stream upstream of the kinetic pulverization stage.

In some embodiments, the friable additive is introduced directly into the kinetic pulverizer as a separate stream from the C&D fines stream.

In some embodiments, the friable additive is the RCA and the RCA comprises at least 60% by weight of a mixture of the RCA and the size-reduced fraction.

In some embodiments, the mixture of the RCA and the size-reduced fraction is configured for use as structural or non-structural clean fill applications.

In some embodiments, the separation stage comprises screening.

In some embodiments, the screening comprises using a single screen or two or more screens arranged in parallel or in series.

In some embodiments, the screening is performed using at least one of: a trommel screen, a vibrating screen, a tumbler screen, a gyratory screen, and a high frequency screen.

In some embodiments, the process further comprises: monitoring at least one parameter of: the C&D fines stream, the pulverized material, the oversized stream and/or the size-reduced stream; and adjusting the kinetic pulverization stage based on the at least one parameter.

In some embodiments, the at least one parameter comprises at least one of: an infeed rate of the C&D fines stream, a moisture content of the C&D fines stream, size properties of the C&D fines stream, and a composition of the C&D fines stream.

In some embodiments, the at least one parameter comprises at least one of:

size properties of the size-reduced fraction in the pulverized material, a composition of the pulverized material, a flow rate of the oversized stream, a flow rate of the size-reduced stream, a composition of the oversized stream, and a composition of the size-reduced stream.

In some embodiments, the adjusting of the kinetic pulverization stage comprises adjusting the rotation speed.

In some embodiments, the adjusting of the kinetic pulverization stage comprises adjusting the infeed rate of the C&D fines stream.

In some embodiments, the C&D fines stream is derived from a construction and demolition material recovery facility (MRF).

In some embodiments, the C&D fines stream comprises at least one building material with the frangible material coupled to the ductile material.

In some embodiments, the at least one building material is at least one of:

asphalt shingles and drywall.

In some embodiments, the ductile material is at least one of: a plastic underlayer, a cellulose underlayer, a fiberglass underlayer, and a paper underlayer.

In some embodiments, the C&D fines stream further comprises an infrangible material.

In some embodiments, the C&D fines stream comprises between 40% and 60% glass, and the size-reduced stream is composed of over 95%, 96%, 97%, 98% or 99% glass.

In some embodiments, the C&D fines stream further comprises an infrangible component.

In some embodiments, the process further comprises subjecting the C&D fines stream to an upstream magnetic separation stage to remove metal therefrom and produce a metal depleted feed stream that is fed to the kinetic pulverization stage.

In some embodiments, the upstream magnetic separation stage is performed by one or more magnetic separators configured relative to a feed of the C&D fines stream.

In some embodiments, the process further comprises subjecting at least one of: the pulverized output stream, the oversized stream, and the size-reduced stream to a downstream magnetic separation stage to remove metal therefrom.

In some embodiments, the downstream magnetic separation stage is performed by one or more magnetic separators configured relative to a feed of the at least one of: the pulverized output stream, the oversized stream, and the size-reduced stream.

In some embodiments, the upstream magnetic separation stage or the downstream magnetic separation stage is performed by at least one of: a non-ferrous metal separator and a ferrous metal separator.

In some embodiments, the process further comprises subjecting the oversized stream to a secondary separation stage to produce a ductile stream and an infrangible stream.

In some embodiments, the secondary separation stage comprises screening.

In some embodiments, the secondary separation stage comprises magnetic separation.

In some embodiments, the process further comprises subjecting the pulverized material to a dust collection stage to recover a dust fraction therefrom and produce a dust reduced pulverized stream that is fed to the separation stage to produce the size-reduced stream and the oversized stream.

In some embodiments, at least a portion of the dust fraction is combined with at least a portion of the size-reduced stream.

In some embodiments, all of the dust fraction is combined with the size-reduced stream.

In some embodiments, the dust collection stage facilitates separation of at least a portion of the ductile material in the oversized fraction.

In some embodiments, the dust collection stage facilitates separation of at least a portion of the frangible material in the size-reduced fraction.

In some embodiments, the dust collection stage comprises: a dust collector coupled with respect to an outlet of the kinetic pulverization stage or with respect to a solids transport device configured for transporting the pulverized material away from the kinetic pulverization stage; and a dust recovery unit coupled to the dust collector and configured to cause separation of the dust and transport of the dust fraction from the dust collector to a storage vessel.

In some embodiments, the dust collector comprises a settling chamber.

In some embodiments, the dust recovery unit comprises a baghouse that is in fluid communication via ducting with the settling chamber.

In some embodiments, the dust recovery unit comprises a cyclone that is in fluid communication via ducting with the settling chamber.

In some embodiments, the solids transport device comprises a conveyor.

In some embodiments, the dust collector surrounds the solids transport device along a majority of a length thereof.

According to another aspect, there is provided a construction and demolition (C&D) debris processing system, comprising: a kinetic pulverizer configured to receive and process a C&D fines stream to produce a pulverized stream; a pulverizer conveyor configured to transport the pulverized stream downstream; and at least one separator operatively coupled to the pulverizer conveyor and configured to receive the pulverized stream and produce a size-reduced stream and an oversized stream.

In some embodiments, the separator comprises a screen.

In some embodiments, the system further comprises: a material recovery facility (MRF) that generates the C&D fines stream; and a fines conveyor configured to transport the C&D fines stream to the kinetic pulverizer.

In some embodiments, the C&D fines stream is derived from construction and demolition debris.

In some embodiments, the C&D fines stream comprises material below 2 or 4 inches in size.

In some embodiments, the kinetic pulverizer is configured for operation at a rotation speed between 500 RPM to 1,200 RPM.

In some embodiments, the kinetic pulverizer is configured for operation at a rotation speed between 700 RPM and 1,000 RPM.

In some embodiments, the system further comprises an addition unit for incorporating a friable additive into the C&D fines stream such that the friable additive is size reduced and is homogenized with the frangible material to form part of the size-reduced fraction.

In some embodiments, the friable additive comprises at least one of: a porosity agent, a soil additive, a building material additive, a compost additive, peat moss, a glass product additive, and a recycled concrete aggregate (RCA).

In some embodiments, the addition unit for adding the friable additive is located upstream of the kinetic pulverizer.

In some embodiments, the addition unit for adding the friable additive is operatively coupled to the kinetic pulverizer.

In some embodiments, the separator comprises at least one of a trommel screen, a vibrating screen, a tumbler screen, a gyratory screen, and a high frequency screen.

In some embodiments, the separator comprises a single screen or two or more screens arranged in parallel or in series.

In some embodiments, the system further comprises: a monitoring unit configured for monitoring at least one feed parameter of the C&D fines stream and/or at least one output parameter of the pulverized stream, the oversized stream, and/or the size-reduced stream; and a control unit coupled to the monitoring unit and configured for adjusting the kinetic pulverizer based on the at least one feed parameter and/or the at least one output parameter.

In some embodiments, the monitoring unit and the control unit are configured such that the at least one feed parameter comprises a feed rate of the C&D fines stream and/or a composition of the C&D fines stream.

In some embodiments, the monitoring unit and the control unit are configured such that the at least one output parameter comprises size properties of the pulverized stream, a composition of the pulverized stream, a flow rate of the pulverized stream, a flow rate of the oversized stream, a flow rate of the size-reduced stream, a composition of the oversized stream, and/or a composition of the size-reduced stream.

In some embodiments, the control unit is configured to adjust the rotation speed of the kinetic pulverizer.

In some embodiments, the control unit is configured to adjust an infeed rate of the C&D fines stream into the kinetic pulverizer.

In some embodiments, the system further comprises an upstream magnetic separator to remove metal from the C&D fines stream and produce a metal depleted feed stream that is fed to the kinetic pulverizer.

In some embodiments, the upstream magnetic separator is operated relative to a feed of the C&D fines stream.

In some embodiments, the process further comprising a downstream magnetic separator to remove metal from at least one of: the pulverized output stream, the oversized stream, and the size-reduced stream.

In some embodiments, the downstream magnetic separator is operated relative to a feed of the at least one of: the pulverized output stream, the oversized stream, and the size-reduced stream.

In some embodiments, the at least one separator is the downstream magnetic separator.

In some embodiments, the system further comprises a dust collection unit configured to recover a dust fraction from the pulverized stream and produce a dust reduced pulverized stream that is fed to the screen.

In some embodiments, the dust collection unit is configured to supply at least a portion of the dust fraction to be combined with at least a portion of the size-reduced stream.

In some embodiments, the dust collection unit comprises: a dust collector coupled with respect to an outlet of the kinetic pulverizer or with respect to the pulverizer conveyor; and a dust recovery unit coupled to the dust collector and configured to cause separation of the dust and transport of the dust fraction from the dust collector to a storage vessel.

In some embodiments, the dust collector comprises a settling chamber.

In some embodiments, the dust recovery unit comprises a baghouse that is in fluid communication via ducting with the settling chamber.

In some embodiments, the dust recovery unit comprises a cyclone that is in fluid communication via ducting with the settling chamber.

In some embodiments, the dust collector surrounds the kinetic pulverizer along a majority of a length thereof.

In some embodiments, the separator comprises at least one of a non-ferrous magnetic separator, a ferrous magnetic separator, and a ductile dust collector.

In some embodiments, the ductile dust collector is configured to remove at least a portion of ductile materials from the pulverized stream and/or the oversized stream.

In some embodiments, at least one of the non-ferrous magnetic separator and the ferrous magnetic separator are configured to remove at least a portion of infrangible materials from the pulverized stream, the size-reduced stream and/or the oversized stream.

In accordance with another aspect, there is provided a process for treating construction and/or demolition debris comprising: providing a feedstock comprising a frangible material and a ductile material; subjecting the feedstock to a kinetic pulverization stage wherein the feedstock is fed into a kinetic pulverizer and subjected to self-collisions created by vortices within the kinetic pulverizer to produce a pulverized material comprising a size-reduced fraction derived from the frangible material and an oversized fraction derived from the ductile material; withdrawing the pulverized material from the kinetic pulverizer; and subjecting the pulverized material to a separation stage to produce a size-reduced stream and an oversized stream.

In some embodiments, the process further comprises subjecting a C&D source material to an upstream separation stage to produce at least one stream of the feedstock.

In some embodiments, the upstream separation stage comprises mechanical screening to pre-size the C&D source material to produce the at least one stream of the feedstock.

In some embodiments, the upstream separation stage comprises upstream magnetic separation to remove metal from the C&D source material or the at least one stream of the feedstock and produce a metal depleted feed stream that is fed to the kinetic pulverization stage.

In some embodiments, the magnetic separation is performed by one or more magnetic separators configured relative to a feed of the C&D source material or the at least one stream of the feedstock.

In some embodiments, the upstream magnetic separation is performed by at least one of: a non-ferrous metal separator and a ferrous metal separator.

In some embodiments, the upstream separation stage comprises manually removing reusable materials from the C&D source material.

In some embodiments, the upstream separation stage comprises an upstream dust collection stage to remove at least a portion of the ductile material from the at least one stream of the feedstock or the C&D source material.

In some embodiments, the upstream dust collection stage is performed by one or more dust collectors configured relative to a feed of the at least one stream of the feedstock or the C&D source material.

In some embodiments, the process further comprises subjecting the feedstock to a pre-treatment stage prior to subjecting the feedstock to the kinetic pulverization stage.

In some embodiments, the pre-treatment stage comprises a drying stage upstream of the kinetic pulverization stage.

In some embodiments, the pre-treatment stage comprises a surface wetting stage upstream of the kinetic pulverization stage.

In some embodiments, the pre-treatment stage comprises a crushing or grinding stage upstream of the kinetic pulverization stage.

In some embodiments, the crushing or grinding stage comprises subjecting the feedstock to a crusher or high speed grinder.

In some embodiments, the process further comprises subjecting at least one of: the pulverized output stream, the oversized stream, and the size-reduced stream to downstream magnetic separation to remove metal therefrom.

In some embodiments, the downstream magnetic separation is performed by one or more magnetic separators configured relative to a feed of the at least one of: the pulverized output stream, the oversized stream, and the size-reduced stream.

In some embodiments, the downstream magnetic separation is performed by at least one of: a downstream non-ferrous metal separator and a downstream ferrous metal separator.

In some embodiments, the feedstock is fed directly to the kinetic pulverization stage at a construction site or a demolition site where the construction and/or demolition debris is generated.

In some embodiments, the process further comprises incorporating a friable additive into the feedstock such that the friable additive is size reduced and is homogenized with the frangible material to form part of the size-reduced fraction.

In some embodiments, the friable additive comprises at least one of: a porosity agent, a soil additive, a building material additive, a compost additive, peat moss, a glass product additive, and recycled concrete aggregate (RCA).

In some embodiments, the friable additive is introduced into the feedstock upstream of the kinetic pulverization stage.

In some embodiments, the friable additive is introduced directly into the kinetic pulverizer as a separate stream from the feedstock.

In some embodiments, the separation stage comprises screening.

In some embodiments, the screening comprises using a single screen or two or more screens arranged in parallel or in series.

In some embodiments, the screening is performed using at least one of: a trommel screen, a vibrating screen, a tumbler screen, a gyratory screen, and a high frequency screen.

In some embodiments, the process further comprises: monitoring at least one parameter of: the feedstock, the pulverized material, the oversized stream and/or the size-reduced stream; and adjusting the kinetic pulverization stage based on the at least one parameter.

In some embodiments, the at least one parameter comprises at least one of: an infeed rate of the feedstock, a moisture content of the feedstock, size properties of the feedstock, a composition of the feedstock, size properties of the size-reduced fraction in the pulverized material, a composition of the pulverized material, a flow rate of the oversized stream, a flow rate of the size-reduced stream, a composition of the oversized stream, and a composition of the size-reduced stream.

In some embodiments, the adjusting of the kinetic pulverization stage comprises adjusting the rotation speed.

In some embodiments, the adjusting of the kinetic pulverization stage comprises adjusting the infeed rate of the feedstock.

In some embodiments, the process further comprises subjecting the oversized stream to a secondary separation stage to produce a ductile stream.

In some embodiments, the secondary separation stage comprises screening.

In some embodiments, the secondary separation stage comprises magnetic separation.

In some embodiments, the process further comprises subjecting the pulverized material to a downstream dust collection stage to recover a dust fraction therefrom and produce a dust reduced pulverized stream that is fed to the separation stage to produce the size-reduced stream and the oversized stream.

In some embodiments, at least a portion of the dust fraction is combined with at least a portion of the size-reduced stream.

In some embodiments, all of the dust fraction is combined with the size-reduced stream.

In some embodiments, the downstream dust collection stage facilitates separation of at least a portion of the ductile material in the oversized fraction.

In some embodiments, the downstream dust collection stage facilitates separation of at least a portion of the frangible material in the size-reduced fraction.

In some embodiments, the feedstock comprises a source separated material having a frangible component comprising the frangible material coupled to a ductile component comprising the ductile material.

In some embodiments, the source separated material comprises gypsum drywall.

In some embodiments, the gypsum drywall further comprise an infrangible component embedded in the ductile component and/or the frangible component.

In some embodiments, the size-reduced fraction comprises a pulverized gypsum product.

In some embodiments, the pulverized gypsum product is configured for use as an agriculture amendment, a soil amendment, a cement mixture additive, or in the production of drywall panels.

In some embodiments, the oversized fraction comprises a plurality of paper or cellulose based underlayers.

In some embodiments, the plurality of paper or cellulose based underlayers are configured for use as animal bedding, mulch, cement kiln fuel, or in the production of paper products.

In some embodiments, the source separated material comprises asphalt shingles.

In some embodiments, the asphalt shingles further comprise an infrangible component embedded in the ductile component and/or the frangible component.

In some embodiments, the size-reduced fraction comprises an asphalt product.

In some embodiments, the asphalt product is configured for use as a cement mixture additive, in the production of biofuels, as an hydrocarbon-based additive, in the production of asphalt, or in the production of shingles.

In some embodiments, the oversized fraction comprises a plurality of paper or fiberglass based underlayers.

In some embodiments, the plurality of paper or fiberglass based underlayers are configured for use as animal bedding, mulch, or in the production of paper products.

In accordance with another aspect, there is provided a process for treating asphalt shingles comprising: providing the asphalt shingles which comprise a frangible asphalt component coupled to a ductile component; subjecting the asphalt shingles to a kinetic pulverization stage wherein the asphalt shingles are fed into a kinetic pulverizer and subjected to self-collisions created by vortices within the kinetic pulverizer to produce a pulverized material comprising a size-reduced fraction derived from the frangible asphalt component and an oversized fraction derived from the ductile component; withdrawing the pulverized material from the kinetic pulverizer; and subjecting the pulverized material to a separation stage to produce a size-reduced stream comprising asphalt and an oversized stream comprising paper or fiberglass.

In some embodiments, the ductile component comprises paper or fiberglass.

In some embodiments, the asphalt shingles further comprise an infrangible material embedded in the frangible asphalt component and/or the ductile component.

In accordance with another aspect, there is provided a process for treating gypsum drywall comprising: providing the gypsum drywall comprising a frangible gypsum component coupled to a ductile component; subjecting the asphalt shingles to a kinetic pulverization stage wherein the gypsum drywall is fed into a kinetic pulverizer and subjected to self-collisions created by vortices within the kinetic pulverizer to produce a pulverized material comprising a size-reduced fraction derived from the frangible gypsum component and an oversized fraction derived from the ductile component; withdrawing the pulverized material from the kinetic pulverizer; and subjecting the pulverized material to a separation stage to produce a size-reduced stream comprising gypsum and an oversized stream comprising paper.

In some embodiments, the ductile component comprises paper.

In some embodiments, the gypsum drywall further comprise an infrangible material embedded in the frangible gypsum component and/or the ductile component.

DETAILED DESCRIPTION

The treatment of streams derived from construction and/or demolition (C&D) debris or C&D source material can include a kinetic pulverization stage through a kinetic pulverizer to generate valuable products depending on the nature of the input C&D material. For example, C&D source material can be pre-sorted or separated to produce different streams, such as source separated streams that substantially include a single type of building material (for example an asphalt shingles stream or a drywall stream) and a C&D fines stream that is left over from the pre-sorting. Each stream can be fed through the pulverization stage to facilitate size reduction and then be subjected to screening, if necessary, to obtain corresponding end products.

In some implementations, the pulverization stage enables the frangible materials to be size-reduced while the ductile materials are liberated and remain as an oversized fraction in the pulverized material. In some implementations, the feedstock includes infrangible materials, which can be liberated and remain as an oversized fraction of the pulverized material. The pulverized material is then subjected to a separation stage, which may include mechanical and/or magnetic screening, to separate the oversized material from the size-reduced material. The separated oversized material can then be disposed of, converted to products like fuel, mulch, cement kiln fuel, animal bedding, etc., or further separated to recover sub-fractions depending on its composition. The size-reduced material can be repurposed in various applications depending on the size and composition properties of the size-reduced material. For example, size-reduced material derived from asphalt shingles may be reused to fabricate new shingles or for road paving applications. Size-reduced material derived from C&D fines or drywall can be used in land applications such as an alternative daily cover (ADC) or a soil amendment, fill, building material additives, and various other applications.

Construction and/or demolition (C&D) debris refers to a waste stream generated during the construction, renovation and/or demolition of roads, bridges, buildings, or other structures. C&D debris can include materials such as Portland cement, asphalt, concrete, steel, wood, shingles, drywall, and brick. During the C&D segregation and recycling process, small particles of soil, drywall, wood, concrete, and other materials are generated and contribute to what are referred to as a "C&D fines stream" or sometimes "recovered screen material" or RSM. C&D source material can also refer to individual building materials that are source-separated or segregated at the job site or that are generated as waste at the factory from the manufacturing process.

Figure 1A:
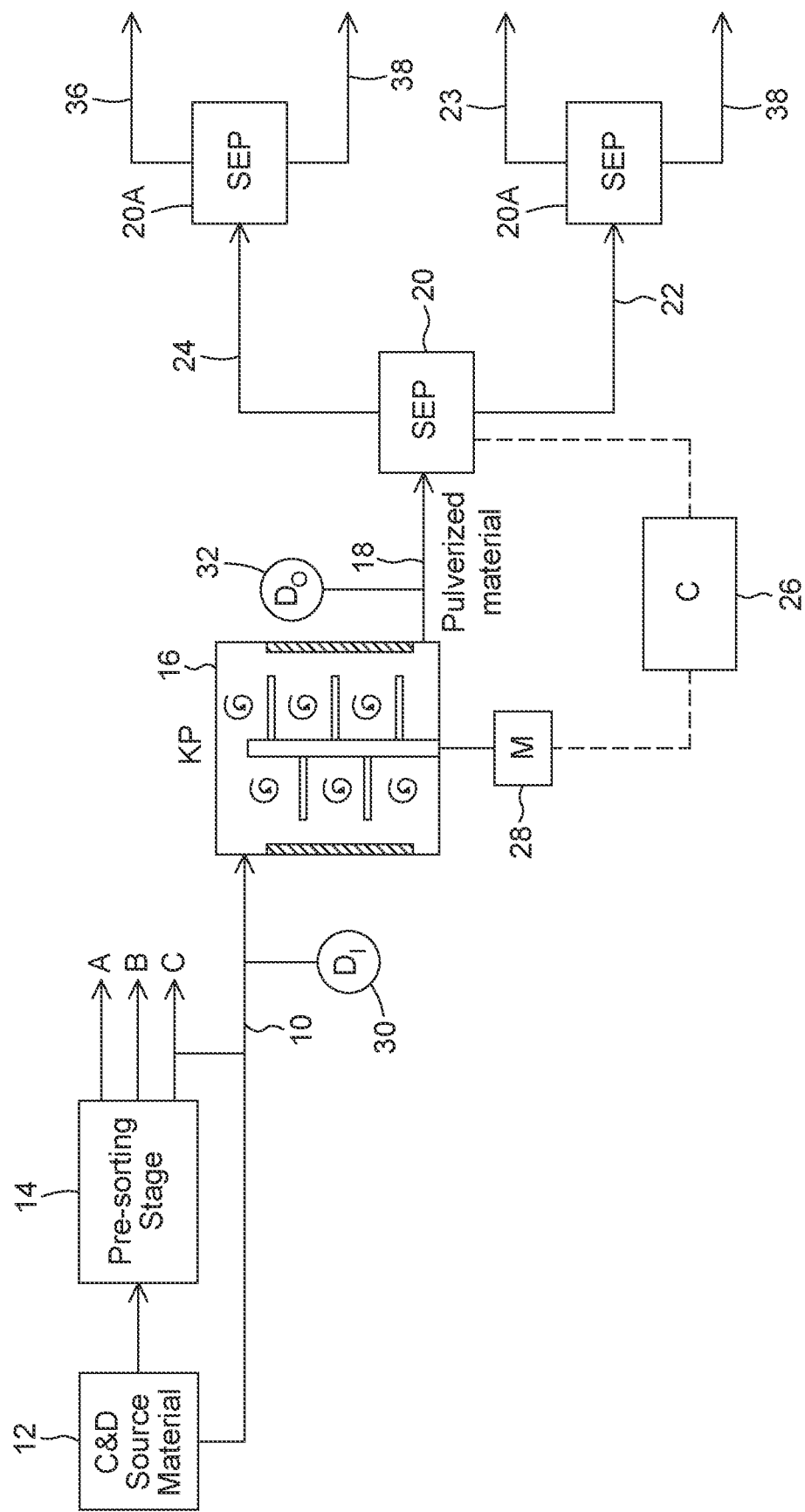
FIG. 1A is a process flow diagram for treating a C&D debris stream using kinetic pulverization followed by separation stages.

Referring to FIG. 1A, a feedstock 10 that is derived from construction and/or demolition (C&D) source material 12 and/or generated in a materials recovery facility (MRF) and/or obtained from a pre-sorting stage 14 is supplied to a kinetic pulverization stage 16 to produce a pulverized output stream 18. The feedstock 10 can be obtained from a pre-sorting stage 14 where the C&D source material can be separated into different streams, for example streams A, B, and C. The streams A, B, and C individually can be a C&D fines stream or source separated streams, such as streams that substantially comprise asphalt shingles, drywall panels, or wood. The feedstock 10 can include frangible materials as well as infrangible materials and/or ductile materials. The frangible materials are typically hard, brittle, or friable such that the kinetic pulverization facilitates notable size reduction, converting the frangible materials into a size-reduced fraction. The frangible materials are size-reduced, for example to sand or silt sized particles, and is homogenized to produce the pulverized output stream 18. Examples of frangible materials can include glass, ceramics, tiles, certain layers of gypsum or drywall, certain layers of asphalt shingles, rocks and aggregates, yard waste (e.g., soil, leaves, organic plant matter), cement, cinderblocks, bricks, and dry wood. The ductile materials, on the other hand, are pliable and not significantly size-reduced by the kinetic pulverization stage 16. Examples of the ductile material include fiberglass, cellulose, plastic or paper based underlayers, fibers such as insulation and rope, wet wood, hard plastics and soft plastics. In contrast, in the context of the present application, the infrangible material is meant to include typically tough and unbreakable material and would not be significantly size-reduced by the pulverizer. Examples of the infrangible material can include metal, such as pieces of reinforcing bars (rebar), nails, screws, and joiners. Thus, when all three materials (frangible, infrangible, and ductile) are present in the feedstock 10, the pulverized output stream 18 can include a size-reduced fraction composed of broken-down frangible material and small infrangible material, and an oversized fraction comprising the ductile material and large infrangible material.

The pulverized output stream 18 can then be subjected to separation 20 to recover a size-reduced stream 22 largely composed of the broken-down frangible material and, optionally, smaller pieces of infrangible material, and an oversized material stream 24, that can be largely composed of the ductile material and/or larger pieces of the infrangible material. The separation step 20 can be performed in one or more stages and can use a variety of separation equipment. For example, various types of screens can be used, such as a vibrating screen, a trommel screen, a tumbler screen, a gyratory screen, and/or a high frequency screen. Other types of separation equipment can also be used, such as dust removal or magnetic or metal separation. The separation equipment could be new and dedicated for the C&D source material treatment process described herein, or could be part of an existing separation stage in the facility. In some implementations, the pulverized output stream 18 is subjected to separation to produce more than two streams that may have various properties that aid separation and enable downstream repurposing or disposal. The separation stage 20 can, for example, include multiple separators (e.g., screens, metal separation, sensor-based sorters, and dust separation) arranged in parallel or in series.

In some implementations, as shown in FIG. 1A, the size-reduced stream 22 that includes a frangible fraction and an infrangible fraction and/or the oversized stream 24 that includes a ductile fraction and an infrangible fraction, can undergo a secondary separation stage 20A to separate an infrangible stream 38 from a frangible stream 23 and from a ductile stream 36, respectively. The separation step 20A can include mechanical screening to sort the oversized stream 24 by size or a metal separation stage to separate the infrangible fraction of ferrous and/or nonferrous metals from the ductile fraction of non-metallic materials to produce the infrangible stream 38 and the ductile stream 36, respectively. In other embodiments, the separation step 20A can include a metal separation stage to separate the infrangible fraction of ferrous and/or nonferrous metals from the frangible fraction of non-metallic materials to produce the infrangible stream 38 and the frangible stream 23, respectively.

Feedstocks

Various C&D feedstocks can be subjected to the kinetic pulverization to produce target size-reduced products. Certain C&D feedstocks and their characteristics will be described in further detail below.

Figure 10:
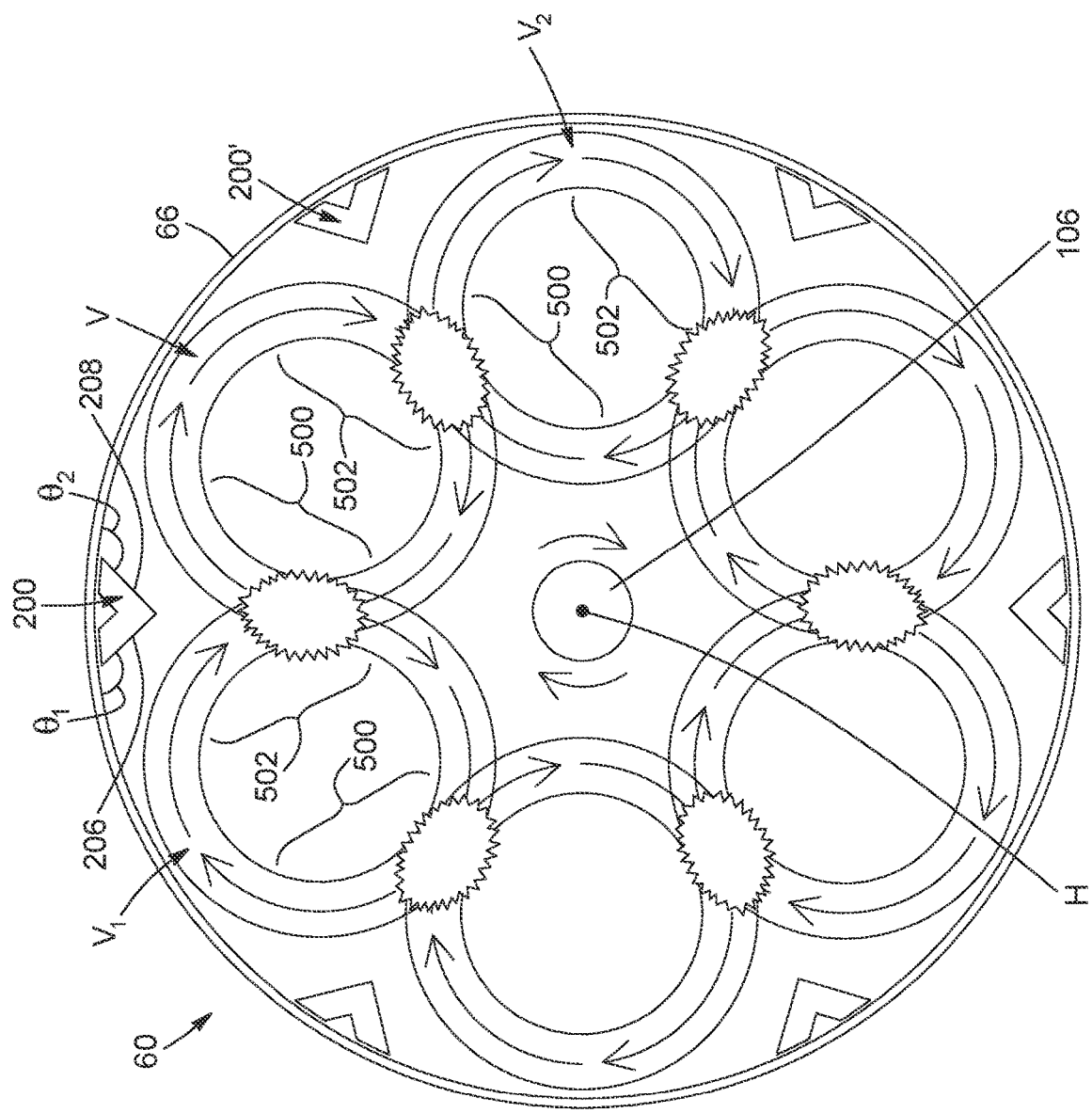
FIG. 10 is a schematic top view of the housing according to an embodiment, showing overlapping vortices within the interior chamber of the housing.

In some implementations, the feedstock 10 can be dry feed material that contains little to no moisture. The feedstock 10 can be fed directly to the kinetic pulverization stage 16 without pre-treatment, such as surface wetting pre-treatment to reduce dust. In other implementations, the feedstock 10 can be wet feed material that is fed directly to the kinetic pulverization stage 16 without pre-treatment, such as drying pre-treatment, as the kinetic pulverizer is capable of effectively handling wet or dry feed material. For example, the feedstock can have a moisture content of up to 50% or between 10% and 40%, and can be fed directly into the kinetic pulverizer without pre-drying or pre-wetting. For wetter feedstocks having a moisture content over 50%, a pre-drying step 15 can be performed to dry the material below 50%, such as shown in FIG. 10. For drier feedstocks having a moisture content of less than 10%, a surface wetting step can be performed to reduce the amount of dust produced during the kinetic pulverization stage 16.

In some embodiments, the size and geometry of the inlet 70 and/or the housing 60 of the kinetic pulverizer 50 can be a factor in determining the size of the feedstock. In some embodiments, the feedstock is pre-crushed or size reduced prior to the kinetic pulverization stage 16. In some embodiments, the density of the infeed material can be a factor in determining the size and/or infeed rate of the feedstock. For example, the infeed rate of the feedstock can be varied to account for the density of the feedstock, such that lower density feedstock, such as drywall, can be fed into the kinetic pulverizer at a faster infeed rate than higher density feedstocks, such as wood.

C&D Fines Stream

The feedstock 10 that is supplied to the kinetic pulverization stage 16 can be a C&D fines stream that is generated in an MRF and would conventionally be used as an ADC landfill cover without further processing or recovery. The MRF receives the C&D waste, separates and prepares reusable or valuable materials for marketing to end-user manufacturers. The composition of the fines stream can vary and will depend on the composition of the construction and/or demolition debris received by the MRF, as well as the processing equipment and operation of the MRF.

The C&D fines typically include pre-sized, pre-screened, or pre-conditioned construction and demolition debris from a sorting and/or processing system.

The C&D fines can be commingled or complex material streams that are typically derived from residential, commercial or industrial construction or demolition. The C&D fines can be pre-processed or screened to remove recyclable content and/or items exceeding 2 inches (although 3-inch, 4-inch, or higher feedstocks, such as up to 8 inches, are also possible) that have limited use or negative value, usually destined for disposal. In some implementations, the feedstock can be pre-shredded or crushed to this size. In other implementations, the C&D fines are screened to this size to remove larger C&D debris that can be reused. In some implementations, the C&D fines can include screenings from construction and demolition debris processing plants, which contain a combination of hard/brittle and soft/ductile components—commonly referred to as "fines", "rejects", or "residual" material.

The C&D fines stream can include any number of materials generally found at construction sites and/or used in the construction process, including dirt or soil, glass, drywall, asphalt shingles, aggregates, ceramics, insulation fibers, rope, metal, cardboard, plastic and paper films, wood, etc. In some implementations, the C&D fines stream can generally have an average composition (% by weight) as follows: aggregate (e.g., rock, brick, concrete, ceramics, glass, dirt) of approximately 50-80%; cellulose matter (e.g., cardboard, fiber board, paper) approximately 1-5%; wood approximately 5-15%; gypsum: approximately 5-25%; metals approximately 0.5-1%; and plastics approximately 1-2%. The size-reduced streams generated from a C&D fines stream can include inert, soil-like concentrate with up to 0.5% visible contaminants (e.g., metal, glass, plastic) with a size over 4 mm. The less friable or brittle fractions of the frangible material, such as wood, are size reduced to a size of between ¼ inch to 6 inches. The oversized stream can be a mix of visible contaminants (e.g., plastic and paper liners), oversized organic matter (e.g., green waste, wet wood), and/or infrangible material (e.g., metal).

Source Separated or Single-Stream Feedstocks

In other implementations, the feedstock 10 can comprise a single stream of one type of waste. The single stream feedstock can include source separated building materials or products that include a frangible material coupled to a ductile material, and optionally an infrangible material that are processed with the kinetic pulverizer to liberate the ductile material, and optionally the infrangible material.

Asphalt Shingles

In some implementations, the source separated feedstock can include asphalt shingles that have a ductile underlayer coupled to a frangible asphalt and mineral granule overlayer, such that the pulverization stage allows liberation and recovery of the asphalt and mineral granule from the ductile underlayer film or membrane. The asphalt shingles can be sorted or unsorted and sized or unsized shingles that are between ¼ of an inch to full-sized, such as 12 inches by 36 inches. In some implementations, the asphalt shingles can be used shingles removed during demolition or a roofing operation that include a fiberglass or paper underlayer film that is coupled to an asphalt overlayer, and optionally can include used metal fasteners, such as roofing nails, that are embedded in the shingle. In some implementations, the single stream feedstock can include factory rejects, such as malformed shingles, that do not include used fasteners.

In some embodiments, asphalt shingles contain about 19% to 36% asphalt cement, about 8% to 40% of mineral filler stabilizers (for example, limestone, silica, or dolomite), and about 20% to 38% mineral granules that are coupled to a felt mat underlayer, which typically consists of a paper or fiberglass mat.

Gypsum Drywall

Another example feedstock is gypsum drywall panels that have a ductile fiber underlayer coupled to a frangible gypsum overlayer, such that the pulverization stage allows for liberation and recovery of the gypsum from the ductile underlayer. The drywall panels can be sorted or unsorted or sized or unsized drywall sheets that can range from between <2½ inches to pre-crushed sheets, typically <3 feet by <6 feet. When the feedstock 10 includes drywall sheets, consideration for the size and geometry of the inlet 70 and/or the housing 60 of the kinetic pulverizer 50 may require the drywall sheets to be size-reduced prior to feeding them into the kinetic pulverizer 50. In some implementations, the drywall can be used drywall panels removed during a demolition operation and optionally can include used metal fasteners, such as drywall screws, that are embedded in the drywall panel. In other implementations, the feedstock can include factory rejects, such as malformed drywall sheets, that do not include used fasteners.

Wood

Another example feedstock is wood products, such as timbers, oriented strand board (OSB), treated wood, untreated wood, engineered wood, etc., that are recovered from a demolition operation and/or scrap wood pieces left over from construction or commercial and industrial operations such as pallets that are not suitable for reuse. In some implementations, the wood products can include used fasteners or other metal objects that are embedded in the wood and cannot be liberated with a magnetic separation pre-treatment.

Pre-Treatment Stages

Prior to the kinetic pulverization stage 16, there are a number of upstream pre-treatment stages that can treat the feedstock 10. For example, an upstream separation stage comprising upstream mechanical screening to presort the feedstock 10 by size and/or upstream magnetic separation can presort the feedstock to remove at least a portion of the infrangible material prior to the kinetic pulverization stage 16. In some embodiments, an upstream dust collection stage can presort the feedstock to remove at least a portion of the ductile material. In other embodiments, the upstream separation stage can comprise manual sorting to remove materials in the feedstock that can be sold as an end product or undergo a separation processing stage.

Figure 1B:
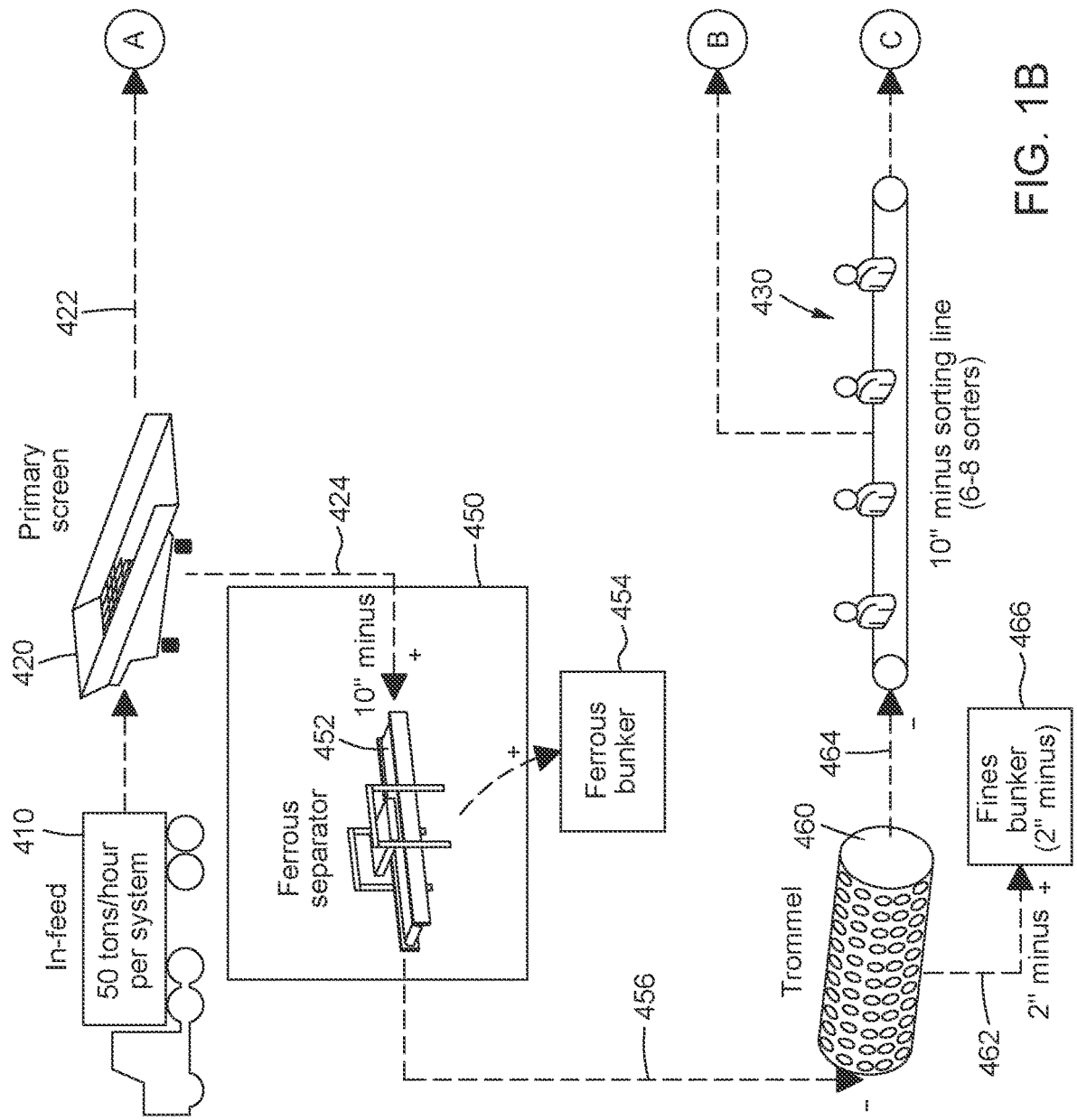
FIG. 1B is a process flow diagram for pre-treating a C&D debris stream using mechanical and manual separation.
Figure 1B:
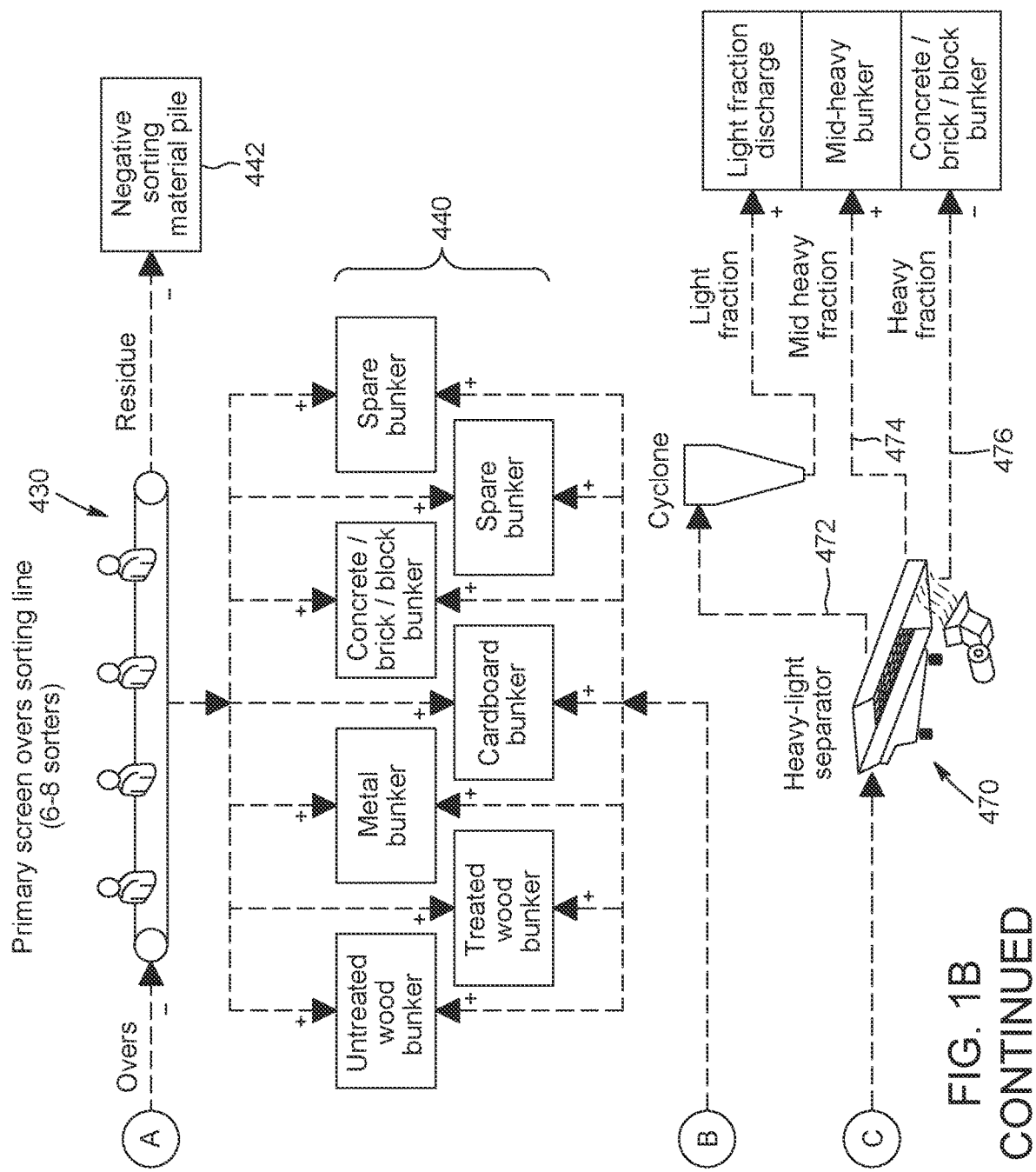
Figure 1C:
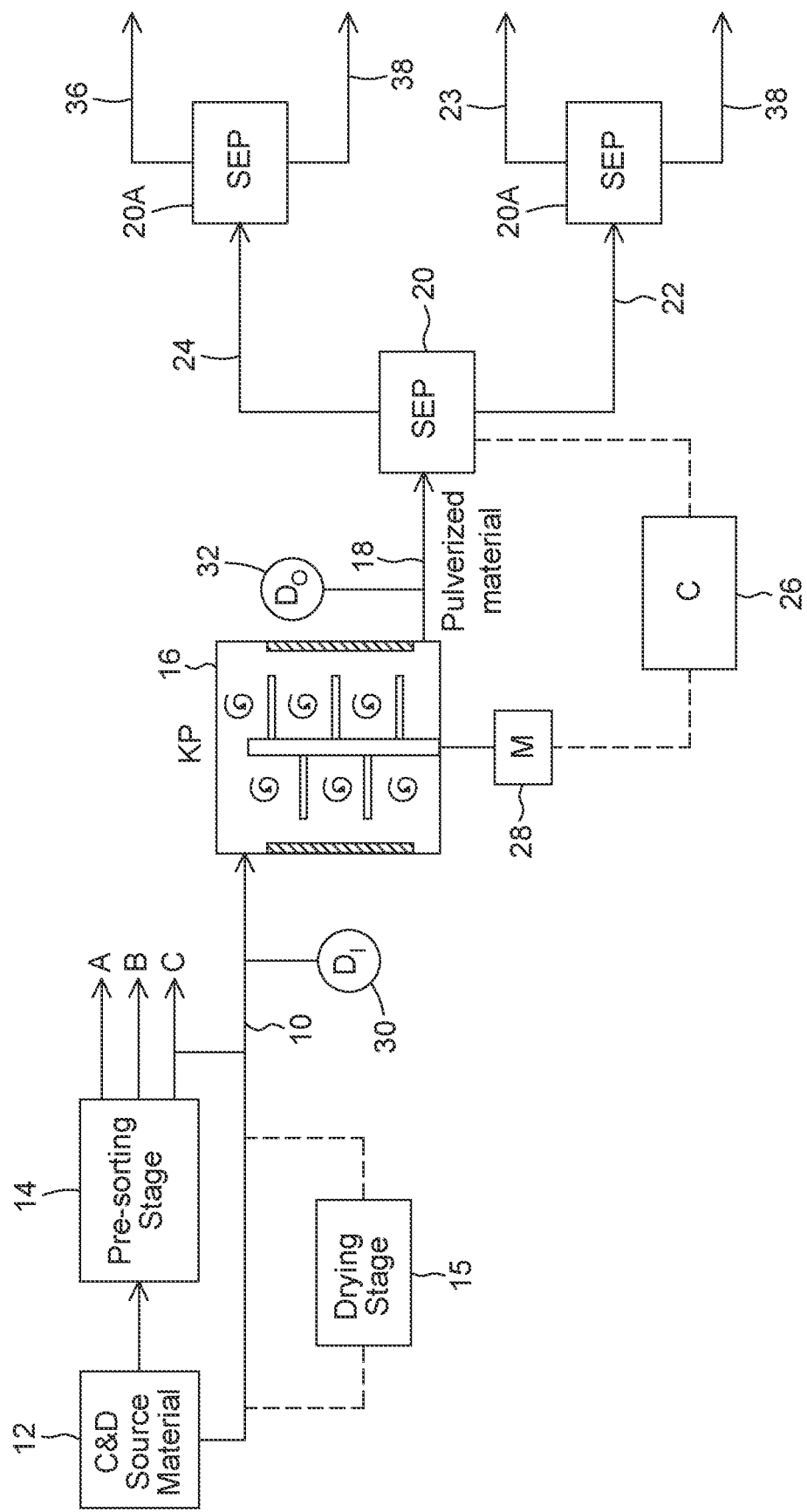
FIG. 1C is a process flow diagram for treating a C&D debris stream using kinetic pulverization followed by separation stages.
Figure 2:
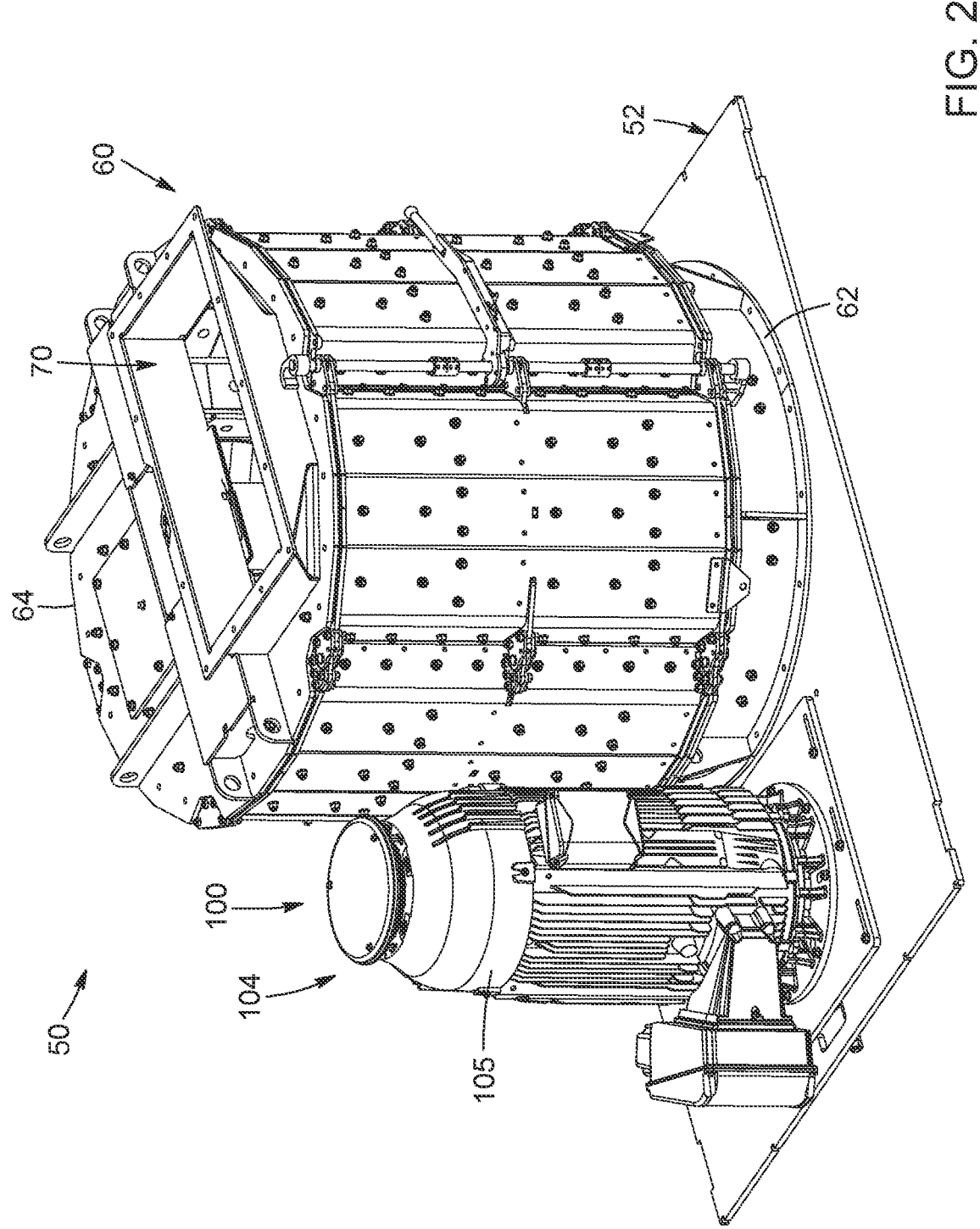
FIG. 2 is a left-side perspective view of a pulverizing apparatus, showing a motor and a housing for the pulverizing apparatus, according to an embodiment.
Figure 3:
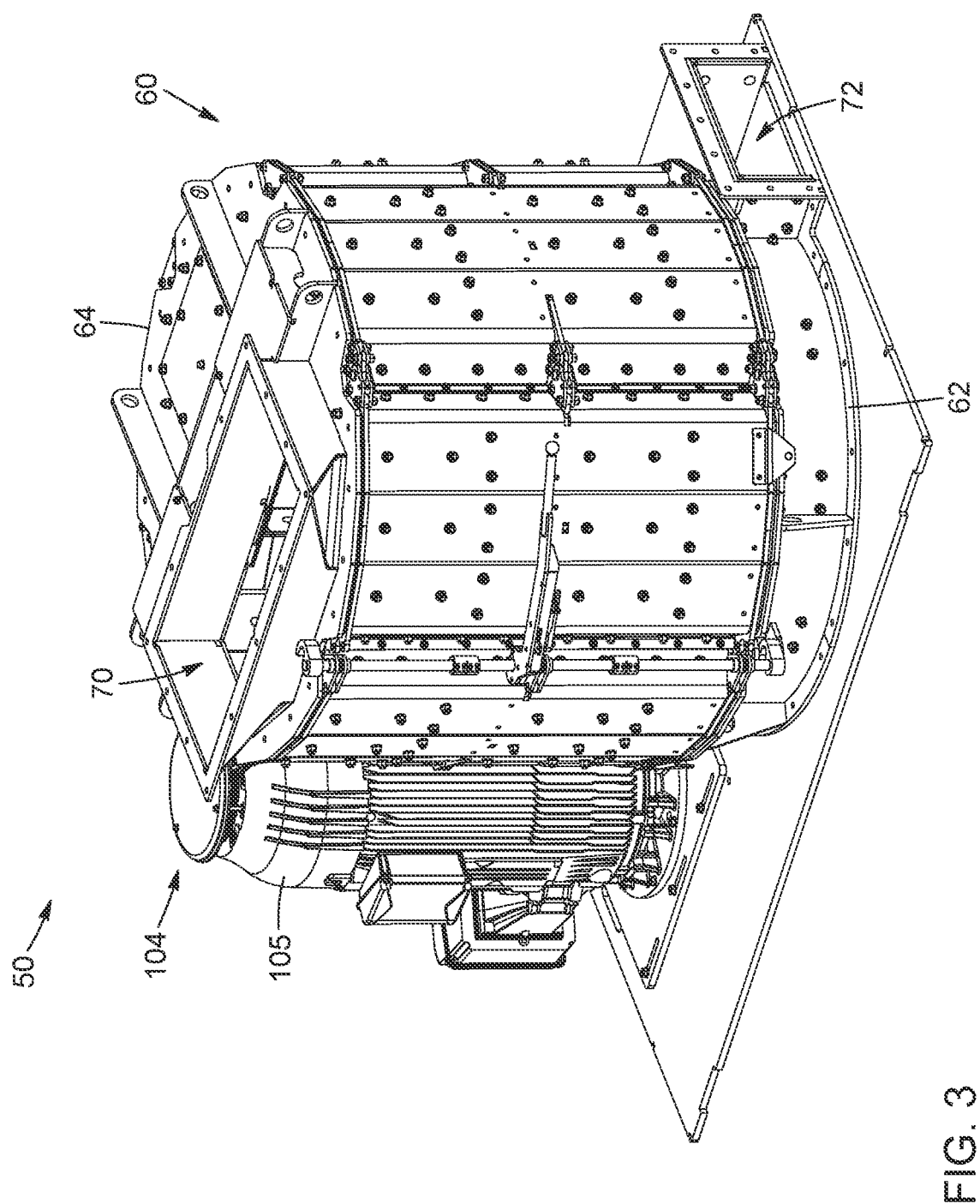
FIG. 3 is a right-side perspective view of the pulverizing apparatus illustrated in FIG. 2, showing an outlet proximate the bottom end of the housing.
Figure 4:
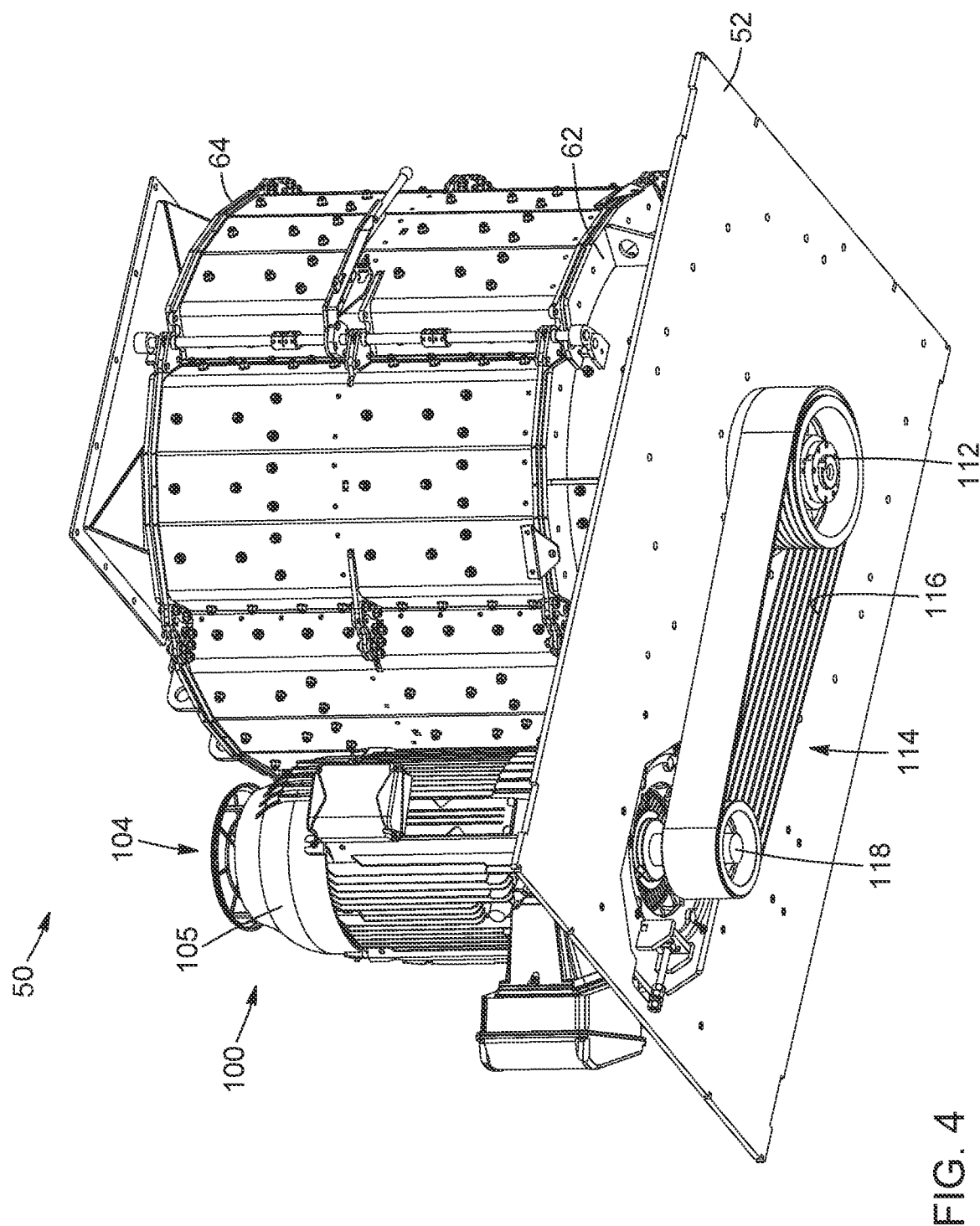
FIG. 4 is a bottom perspective view of the pulverizing apparatus illustrated in FIG. 2, showing a belt connection connecting the motor and a rotatable shaft.
Figure 5:
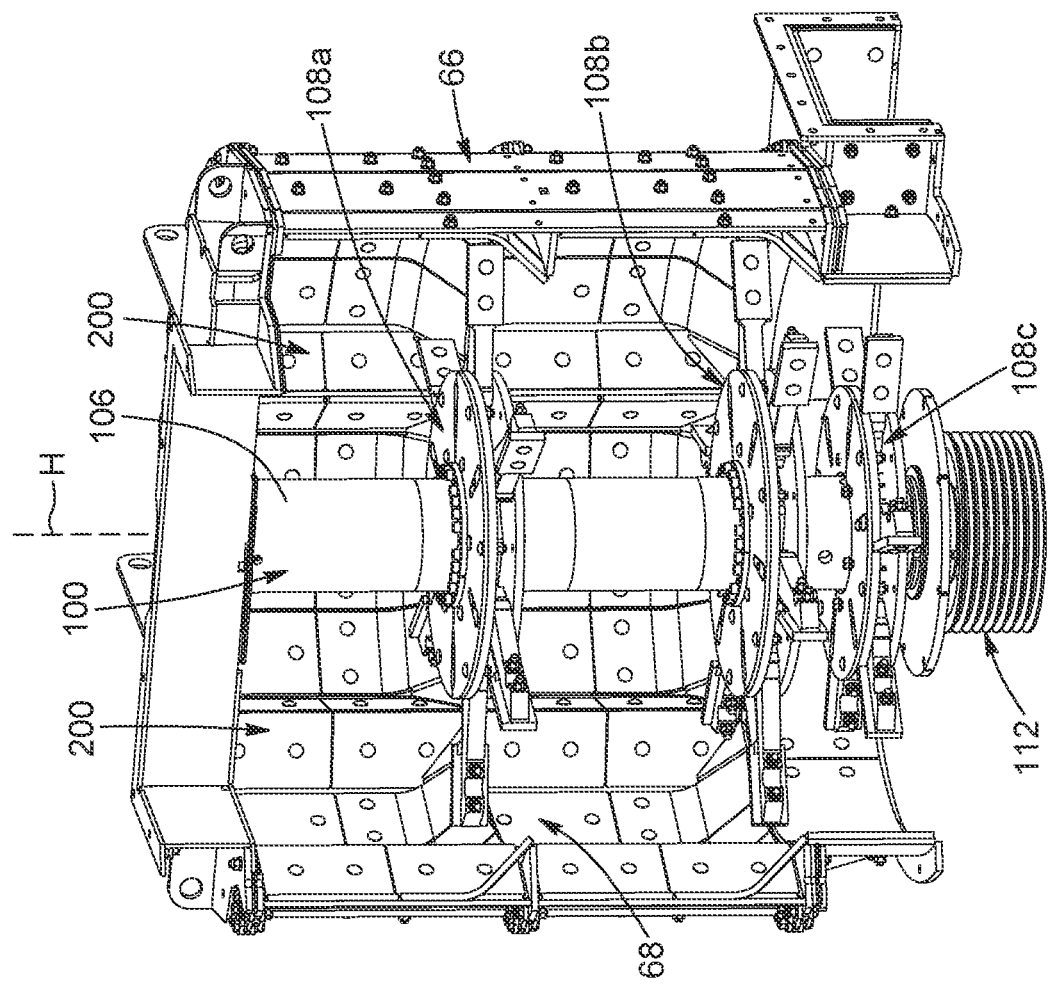
FIG. 5 is a section view of the housing illustrated in FIG. 3, showing the rotatable shaft and rotors positioned within the housing.

Referring now to FIG. 1B, C&D infeed material 410 that includes raw and unsorted construction and/or demolition debris can be transported to a sorting facility, such as an MRF. The infeed material 410 undergoes a primary pre-screening stage 420, for example a 10-inch screen, to produce an oversized unsorted stream 422 and an undersized unsorted stream 424.

The oversized unsorted stream 422 can be transported, for example via a conveyer belt, to a manual sorting stage 430 that can include any number of MRF staff members, for example 6 to 8 sorters, that sorts the oversized unsorted stream 422 into individual source separated streams 440 that are placed in bunkers based on the composition of the items. The source separated streams 440 can include individual streams of untreated wood, treated wood, metal, cardboard, concrete/bricks/blocks, and/or unidentified items. Any undesirable or rejected materials and other residue can be transported to a negative sorting material pile 442.

The undersized unsorted stream 424 can undergo a magnetic separation pretreatment stage 450 with a magnetic or ferrous separator 452 to remove ferrous particulates in the undersized unsorted stream 424 and place them in a ferrous bunker 454. A ferrous-reduced undersized stream 456 can then undergo a secondary screening stage 460, for example with a 2-inch vibratory or rotating trommel screen, to produce a C&D fines stream 462 that includes materials under 2 inches in size and an undersized sorted stream 464. The C&D fines stream 462 can be stored in a fines bunker 466 to await further processing by the kinetic pulverizer or to be transported to a facility with a kinetic pulverizer. The undersized unsorted stream 464 can also undergo a 10 inch minus manual sorting stage 430 that sorts the undersized sorted stream 464 into the same individual source separated streams 440 as the oversized sorted stream 422. Any undesirable or rejected materials and other residue can be transported to undergo a heavy-light separation stage 470, such as a wind sifting separator and/or a cyclone, to produce a light fraction 472, a mid-heavy fraction 474, and a heavy fraction 476. Depending on the contents of the light fraction 472, the mid-heavy fraction 474, and/or the heavy fraction 476, the contents can be redistributed to the source separated streams 440 and/or disposed of.

In some embodiments, the feedstock 10 can include the C&D fines stream 462, the negative sorting material pile 442, the light fraction 472, the mid-heavy fraction 474, and/or the heavy fraction 476. In some embodiments, the negative sorting material pile 442, the light fraction 472, the mid-heavy fraction 474, and/or the heavy fraction 476 can undergo a pre-crushing or pre-grinding stage upstream of the kinetic pulverization stage 16. For example, a crusher or high-speed grinder can be used to reduce the size of these streams to be included in the C&D fines stream 466 (i.e., pre-size reduce the feedstock to a size of less than 2, 4, or 6 inches).

Kinetic Pulverization Stage

Regarding the kinetic pulverization stage 16, a single kinetic pulverizer can be implemented and operated as a one-pass stage. For example, the feedstock can be fed into an upper part of the kinetic pulverizer, which includes a drum with baffles and an internal rotating stem with multiple arms that create vortexes within the drum chamber. The feed material passes into the vortices and experience self-collision for size reduction of the frangible material, while leaving the ductile material oversized and not significantly size reducing the infrangible material. Accordingly, when the feedstock 10 includes materials with a frangible material connected to a ductile material and/or an infrangible material, the kinetic pulverization stage 16 can facilitate the liberation of the frangible material from the ductile material and/or the infrangible material.

In some cases, the process, kinetic pulverization stage 16 and/or kinetic pulverizer 50 can be operated in continuous mode or in semi-batch mode. It is also possible to pulverize the material in a single pass or using multiple passes through the kinetic pulverizer 50. When multiple passes are used, the pulverized material from a first pass can be screened and only a fraction fed through a subsequent pass. More generally, certain materials or fractions can be subjected to multiple pulverization stages, which may be done in the same kinetic pulverizer 50 via recycling or in multiple kinetic pulverizers 50 operated in series. The material can be batch fed or continuous fed into the kinetic pulverizer 50. Each pass through the kinetic pulverizer 50 may be done at the same or different operating conditions (e.g., rotation speed, feed rate) where variations in operating conditions are determined based on the composition of the feed for each pass, for example.

The kinetic pulverization stage 16 uses kinetic energy, vortices and matter-on-matter collisions to achieve size reduction of the frangible material, homogenization of the frangible material, liberation of the ductile material and/or the infrangible material, and/or blending of additives that may be incorporated with the feedstock 10.

The material passes to a bottom region of the kinetic pulverizer and is expelled via a lower outlet as the pulverized output stream 18. The kinetic pulverizer can be operated with a rotation speed between 500 RPM to 1,200 RPM or between 600 RPM and 1,100 RPM or between 700 RPM and 1,000 RPM. The rotation speed can be adjusted in response to other process parameters or maintained relatively constant. In some implementations, the rotation speed is adjusted to control the size and/or quality of the output material. In some implementations, the rotation speed is adjusted or varied based on the density of the feedstock. For example, lower density feedstocks, such as drywall, can be size reduced with a lower rotational speed than higher density feedstocks, such as wood.

The kinetic pulverization stage can not only enable targeted size reduction of the frangible material, but can also facilitate drying and/or pathogen reduction for a higher quality output stream. In some implementations, the pulverizing stage reduces the moisture by 5 to 8% and then the separation stage enables the size-reduced fraction to have a further lowered moisture content.

C&D Fines Stream

When the C&D fines stream is subjected to the kinetic pulverization stage 16, the frangible materials in the C&D fines stream is pulverized and homogenized. In some embodiments, the frangible material in the C&D fines stream is micronized or nanosized to sand or silt like particles. The ductile material, whether freely available in the C&D fines stream or coupled to a frangible material (for example, pieces of glass (frangible) coupled to a plastic film (ductile)), is not significantly size reduced and can be isolated from the pulverized frangible material during the separation stage 20. Any particulates of infrangible material that were not removed in a metal separation pre-treatment step are not significantly size reduced and, can be isolated from the infrangible and ductile materials during the separation stage 20 or a secondary downstream separation stage.

Source Separated or Single-Stream Feedstocks

Asphalt Shingles

When the feedstock 10 is a source separated or single-stream feedstock containing used or factory reject asphalt shingles and is subjected to the pulverization stage 16, the kinetic pulverizer pulverizes and homogenizes the more frangible asphalt component and liberates the asphalt component from the less frangible granules and ductile plastic or fibrous underlayer. When used shingles are included in the feedstock 10, the feedstock 10 can further include an infrangible material that is not significantly size-reduced, and can be separated from the material during a downstream separation stage. In some embodiments, certain sized fractions of the pulverized output stream 18 comprising the frangible component and/or the ductile component can be recirculated through a second kinetic pulverization stage 16. The second kinetic pulverization stage 16 can be a second kinetic pulverizer 50, or the pulverized output stream 18 can be recirculated through the same kinetic pulverizer 50.

As described herein, the kinetic pulverizer causes matter-on-matter collisions within the vortexes created by the kinetic pulverizer. Asphalt shingles generally contain about 19% to 36% asphalt cement, which can form a sticky, black, highly viscous liquid or semi-solid form when subjected to heat. Conventional methods of grinding asphalt shingles generate heat and can cause the asphalt to form a sticky, viscous semi-solid and impair the functioning of the grinder and/or the quality of the final end product. However, when asphalt shingles are subjected to the kinetic pulverization stage, the shingles are subjected to matter-on-matter collisions within vortexes that inherently have an airflow that reduces heat that is produced from the matter-on-matter collisions. In some embodiments, the kinetic pulverization stage 16 is around 15 to 20 seconds for any given material, before the material is expelled via a lower outlet, thus resulting in significantly less heat production. The resulting pulverized output stream 18 includes a pulverized frangible material (i.e., an unheated or cooled asphalt product that is micronized or nanosized and homogenized) that is liberated from an oversized ductile material (i.e., the paper or fiberglass underlayer), and optionally, when the feedstock 10 includes used asphalt shingles, an infrangible material (i.e., the metal fasteners or other impurities).

In some embodiments, the kinetic pulverization stage 16 can be used in processes for separating and extracting raw materials from residential roofing products, such as asphalt shingles, such as the processes described in U.S. Pat. Nos. 8,919,681, 9,156,035, and 9,440,239, all of which are incorporated herein by reference. In some embodiments, the kinetic pulverizer 50 as described herein could replace one or more of the size reduction stages in these processes. For example, the kinetic pulverization stage 16 described herein can be used to mechanically reduce the size of the residential roofing products to produce shredded and/or chip products, while leaving the ductile underlayer as an oversized fraction.

Gypsum Drywall

When the feedstock 10 is a source separated or single-stream feedstock containing used or factory reject drywall panels and is subjected to the pulverization stage 16, the kinetic pulverizer pulverizes and homogenizes the frangible gypsum component and liberates the gypsum component from the paper underlayer, which is a ductile material and thus not significantly size reduced. When used drywall is included in the feedstock 10, the feedstock 10 further includes an infrangible material that is not significantly size-reduced, and can be separated from the material during a downstream separation stage.

Wood

When the feedstock 10 is a source separated or single-stream feedstock containing processed or unprocessed wood products and is subjected to the pulverization stage 16, the kinetic pulverizer pulverizes and homogenizes the frangible wood component and liberates the wood component from any infrangible metal components that may be embedded in the wood, which are an infrangible material and thus not significantly size reduced. The infrangible material can be separated from the pulverized frangible material in a downstream magnetic separation stage, thus creating a homogenized size-reduced wood product that can be used for animal bedding, mulch, etc.

Separation Stage

Regarding the pulverized output stream 18, in some implementations the pulverization stage 16 generates material that ranges from silt or dust-sized particles to larger particles, with the majority (e.g., over 50% or between 50% and 70% or even over 90%) passing a ¼ inch screen. Oversized material includes the lower density, flexible fraction of feedstock (i.e., ductile material) and the infrangible material, while pulverizing of the frangible material, which is brittle, hard, friable. Some frangible materials can have a larger output or pulverized size, such as wet wood, which can be size-reduced to pass through a 6 inch to ¼ inch sieve. The pulverization stage 16 homogenizes the resulting size-reduced fraction to facilitate liberation and separation from the larger ductile fraction and infrangible fraction through various separation technologies that can include screening. The oversized fraction can be substantially composed of the ductile materials, including plastic and paper films, fibers, etc., and the infrangible materials, including metal.

The oversized fraction can then be separated from the size-reduced fraction using a size-based separation technique, such as screening. The screening can be performed using various types of mechanical screens, such as a vibrating screen, a tumbler screen, a trommel screen, a gyratory screen, and/or high-frequency screen, among others. The mechanical screen can be configured or operated based on the composition and size distribution of the pulverized output stream 18 to favour separation of the size-reduced and oversized fractions from each other. The screen can be provided to favour or maximize high purity or high yield of the oversized stream 24 (e.g., plastics), or to favour other parameters related to the size-reduced stream 22 and/or the oversized stream 24. The size-reduced stream 22 and/or the oversized stream 24 can then be subjected to further processing and recovery, if desired.

In some implementations, the infrangible materials can comprise small fragments that cannot be removed via mechanical screening (i.e., small metal particulates that are homogenized with the pulverized frangible material). The separation stage 20 can include a metal separation stage upstream and/or downstream of the kinetic pulverization stage 16 and/or the mechanical screening. When the infrangible material is embedded within a frangible material, for example, metal fasteners embedded in wood, shingles, or drywall, the kinetic pulverization stage 16 can liberate the infrangible material, to allow separation during a downstream magnetic separation stage 20. Whereas an upstream magnetic separation stage may be required to remove large infrangible materials that could cause damage to the kinetic pulverizer. In some implementations, the feedstock 10 is subjected to an upstream metal separation stage that substantially depletes the feedstock 10 of any infrangible materials.

In some implementations, the separation stage 20 and the pulverization stage 16 are coordinated such that the operation of one can influence the other. For example, the screen and the pulverizer can be monitored and controlled via a controller 26 to achieve a desired parameter, such as certain properties of the size-reduced stream 22 and/or the oversized stream 24. For example, if a change in the input feedstock results in the pulverizer generating a larger size-fraction in the pulverized stream 18, the screen can be controlled accordingly to favour a certain desired separation. In addition, the kinetic pulverizer can be controlled, e.g., to increase the rotation speed by controlling the motor 28 or to reduce the infeed rate by controlling the infeed conveyor, to bring the size-reduced fraction back to within a target range to facilitate a desired separation.

Monitoring instrumentation, such as an inlet detector Di 30 and an outlet detector Do 32, can be provided to monitor properties of the streams (e.g., size distribution, composition, moisture content, mass, and/or volume flow rates). Depending on the size-reduced product to be produced, the screen and the kinetic pulverizer can be operated and designed in certain ways to generate a specific product, such as an end product having a maximum size. For example, when glass is the dominant component of the size-reduced fraction, the screen can be 50 mesh (~295 µm) and the kinetic pulverizer operates to size reduce the glass below 295 µm. When organics are a dominant component of the size-reduced material, such as wood-based building materials or yard and excavation waste, the screen can be ⅜ inch or ½ inch. However, it is noted that the screen design can be market driven to provide various size distributions of the size-reduce material.

In some implementations, the various streams are transported between stages using conveyor systems to facilitate continuous operation, although other transport methods can be used. The process can be continuous, batch feed, or operated according to other schemes depending on the facility and other factors.

Kinetic Pulverizer

The kinetic pulverizer can have various structural and operational features. It some implementations, the kinetic pulverizer can have one or more features as described in PCT/CA2019/050967, which is incorporated herein by reference.

Referring now to FIG. 2 to FIG. 10, there is shown a pulverizer 50, in accordance with one embodiment. The pulverizer 50 is adapted to receive an input material as described herein and to pulverize or comminute the input material.

It will be understood that the terms "pulverize", "pulverization", "comminute" and "comminution" are used herein to refer to a reduction in size of the particles in the input material.

In the illustrated embodiment, the pulverizer 50 includes a base 52 and a housing 60 mounted over the base 52. Specifically, the housing 60 includes a bottom end 62 connected to the base 52 and a top end 64 opposite the bottom end 62. The housing 60 is hollow and includes a housing sidewall 66 extending between the top and bottom ends 64, 62 to define an interior chamber 68 in which the pulverization occurs. Specifically, the housing 60 includes an inlet 70 located at the top end 64 to receive the input material and an outlet 72 located at the bottom end 62 through which the pulverized material may be discharged once having been pulverized in the interior chamber 66. In the illustrated embodiment, the outlet 72 allows pulverized material to be discharged in a tangential direction to the housing sidewall 66. It will be understood that the outlet 72 may be configured differently. For example, the outlet 72 may be located in a bottom face of the housing 60 such that the pulverized material may be discharged in an axial direction downwardly from the housing 60. It will also be understood that alternatively, the outlet 72 may be positioned substantially towards the bottom end 62 but may not be positioned exactly at the bottom end 62 of the housing 60. Similarly, the inlet 70 may not be positioned exactly at the upper end 64 of the housing 60 and may instead be located generally towards the upper end 64.

In the illustrated embodiment, the housing 60 is generally cylindrical and defines a central housing axis H extending between the top and bottom ends 64, 62 of the housing 60. The housing 60 is adapted to be disposed such that the central housing axis H extends substantially vertically when the pulverizer 50 is in operation. In this configuration, the input material fed into the inlet 70 will ultimately tend to fall down towards the outlet 72 by gravity.

In the illustrated embodiment, the airflow generator 100 includes a pulverizing rotor assembly 102 disposed within the interior chamber 68 and a rotary actuator 104 operatively coupled to the pulverizing rotor assembly 102 for rotating the pulverizing rotor assembly 102 to generate the airflow, for example, to facilitate air stripping. Specifically, the pulverizing rotor assembly 102 includes a rotatable shaft 106 located in the interior chamber 68 and extending between the top and bottom ends 64, 62 of the housing 60, along the central housing axis H, and a plurality of pulverizing rotors 108a, 108b, 108c secured to the rotatable shaft 106 so as to rotate about the central housing axis H when the rotatable shaft 106 is rotated.

Each pulverizing rotor 108a, 108b, 108c includes a rotor hub 120 and a plurality of rotor arms 122 extending outwardly from the rotor hub 120 and towards the housing sidewall 66. The rotatable shaft 106 extends through the rotor hub 120 such that the rotor arms 122 are disposed in a rotation plane R which extends orthogonally through the central housing axis H. In this configuration, when the rotatable shaft 106 is rotated, the rotor arms 122 therefore remain in the rotation plane R and move along the rotation plane R. Alternatively, instead of all being disposed in a rotation plane, the rotor arms 122 could instead be angled upwardly or downwardly relative to the rotatable shaft 106. In yet another embodiment, the rotor arms 122 could instead be pivotably connected to the rotatable shaft 106 such that the rotor arms 122 could selectively be angled upwardly and downwardly as desired, either manually or automatically using one or more arm actuators.

In the illustrated embodiment, the plurality of airflow deflectors 200 includes six deflectors 200 which are substantially similar to each other and which are substantially evenly spaced from each other in an azimuthal direction (i.e. along a circumference of the housing sidewall 66) around the central housing axis H. Alternatively, all the deflectors 200 may not be similar to each other, may not be spaced from each other evenly and/or the pulverizer 50 may include more or less than six deflectors 202. For example, the pulverizer 50 may include between two and eight deflectors 200.

In the illustrated embodiment, each deflector 200 is elongated and extends substantially parallel to the housing axis H. Specifically, since the housing 60 is positioned such that the central housing axis H extends substantially vertically, the deflectors 200 also extend substantially vertically.

Figure 6:
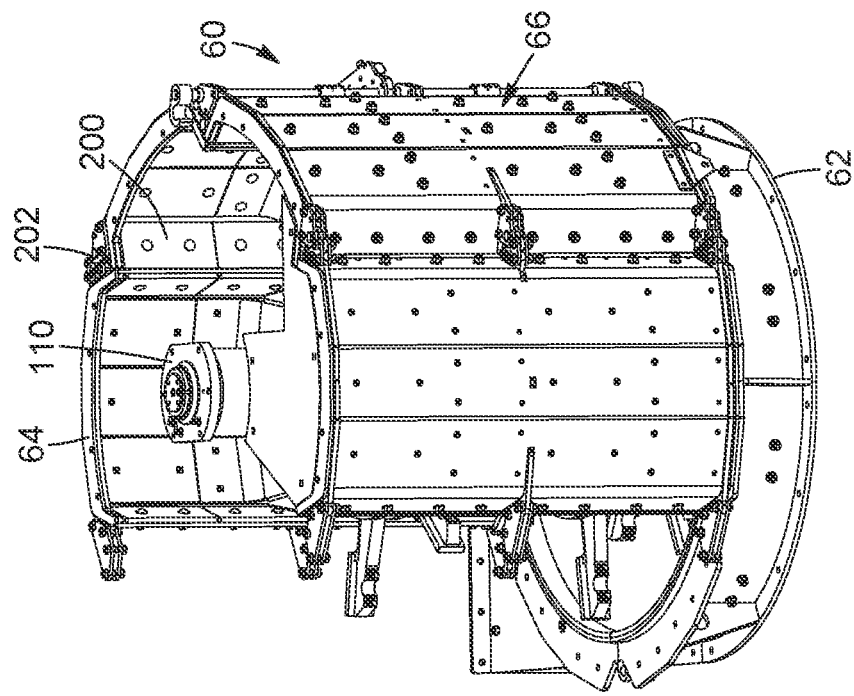
FIG. 6 is a partially exploded view of the housing for the pulverizing apparatus illustrated in FIG. 2.
Figure 6:
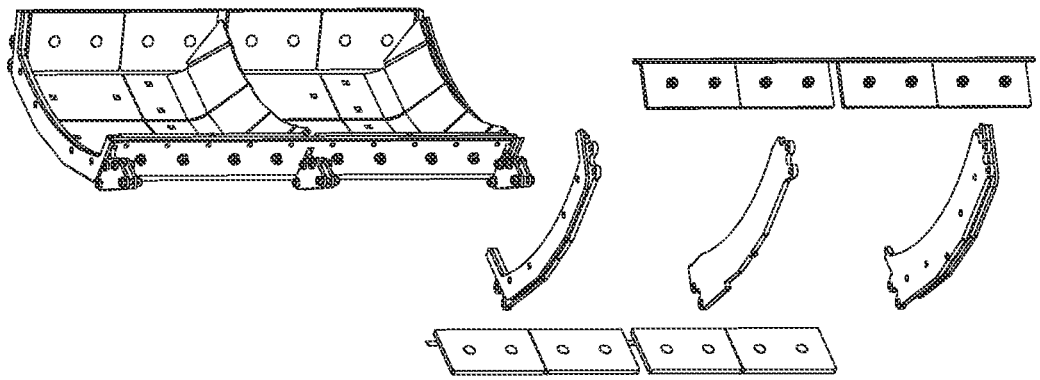
Figure 6:
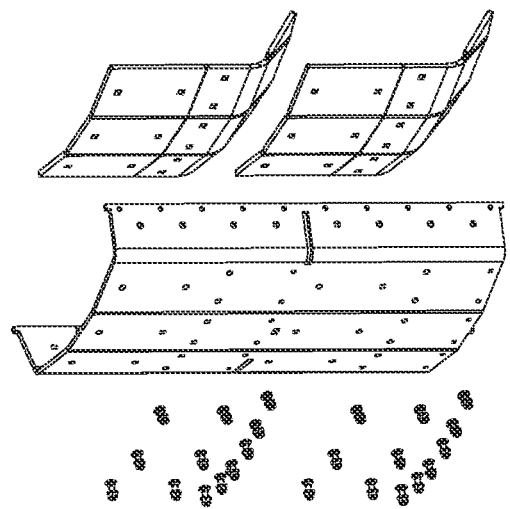
Figure 7:
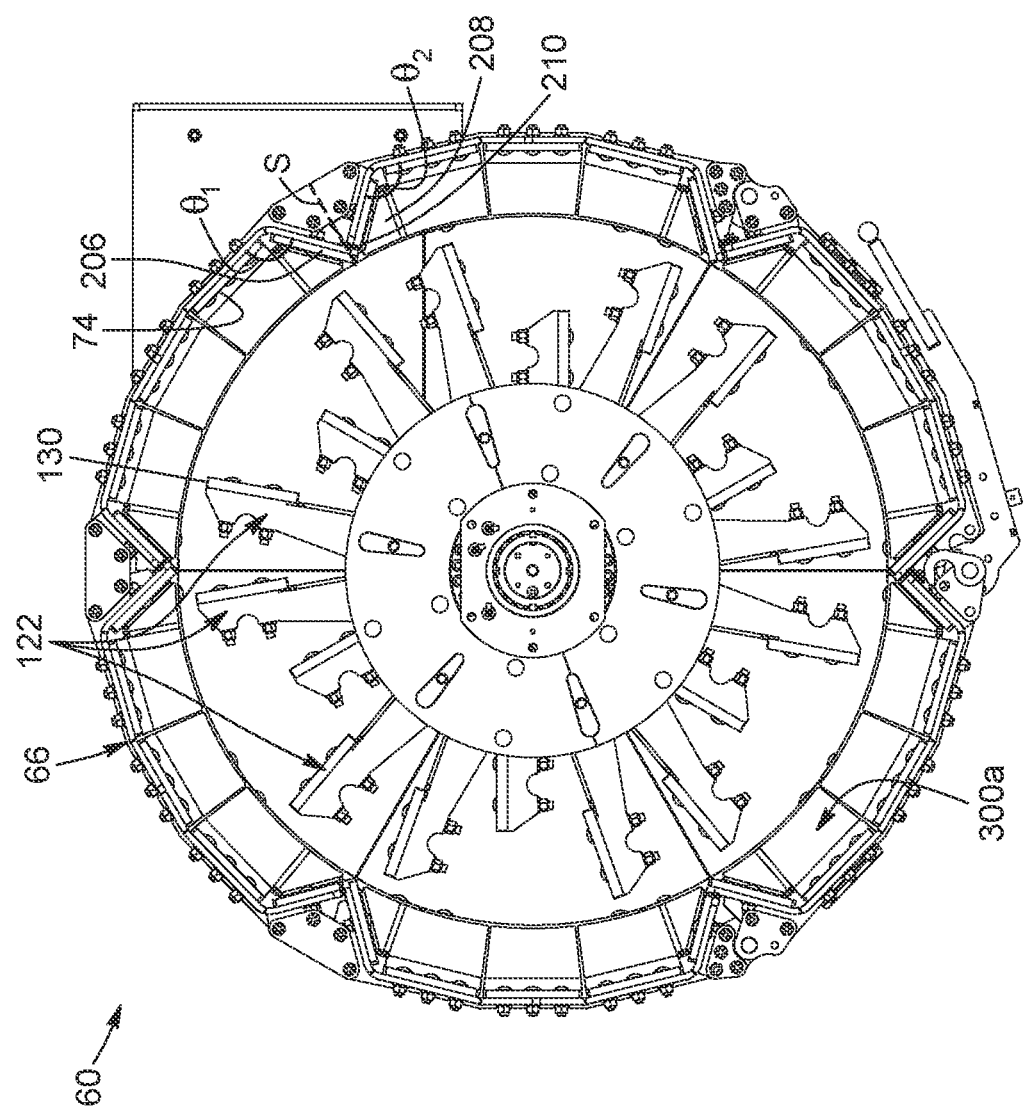
FIG. 7 is a top sectional view of the housing for the pulverizing apparatus illustrated in FIG. 2, showing a plurality of deflectors spaced about the rotatable shaft along the housing sidewall.
Figure 8:
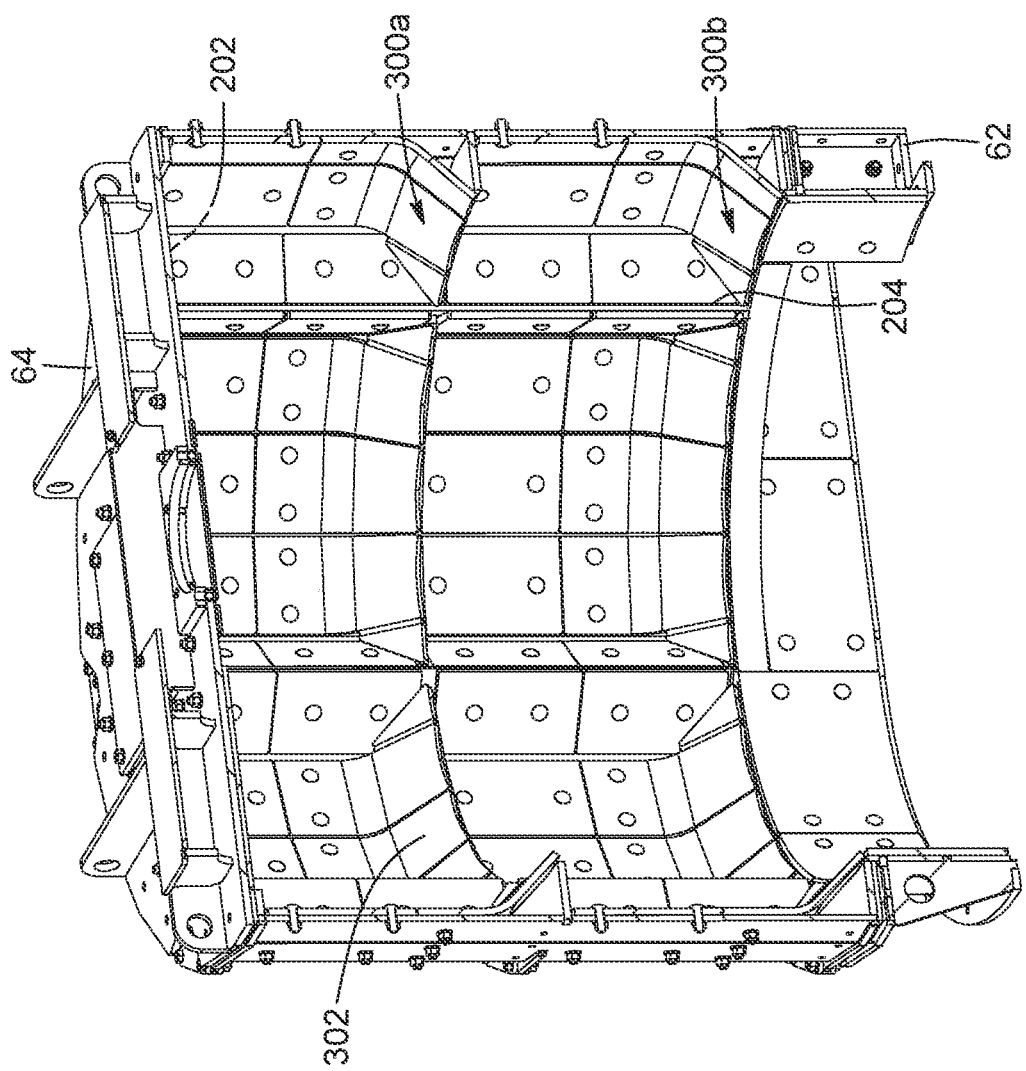
FIG. 8 is a section view of the housing shown in FIG. 5 with the rotatable shaft and rotors removed therefrom, showing shelves positioned along the sidewall at different levels within the housing.

As best shown in FIGS. 6 to 8, each deflector 200 includes a top end 202 located towards the top end 64 of the housing 60 and a bottom end 204 located towards the bottom end 62 of the housing 60. In the illustrated embodiment, each deflector 200 is positioned so as to intersect the rotation plane R of the upper pulverizing rotor 108a and of the intermediate pulverizing rotor 108c. More specifically, the top end 202 of the deflectors 200 is located above the upper pulverizing rotor 108a while the bottom end 204 of the deflectors 200 is located below the intermediate pulverizing rotor 108c, and the deflector 200 extends continuously between its top and bottom ends 202, 204.

It will be understood that rotation of the rotor arms 122 will cause the air within the interior chamber 68 to move outwardly towards the housing sidewall 66. In the above configuration, since the deflectors 200 are horizontally aligned with the upper and intermediate pulverizing rotors 108a, 108c, the air will be moved outwardly by the upper and intermediate pulverizing rotors 108a, 108c against the deflectors 200 to be deflected by the deflectors 200 to form the vortices V, best shown in FIGS. 9 and 10.

In the illustrated embodiment, each deflector 200 is generally wedge-shaped. Specifically, each deflector 200 has a generally triangular cross-section and includes a flow facing deflecting surface 206 which faces towards the airflow when the rotatable shaft 106 is rotated and an opposite deflecting surface 208 which faces away from the airflow. The flow facing deflecting surface 206 and the opposite deflecting surface 208 extend away from the housing sidewall 26 and converge towards each other to meet at an apex 210 which points towards the housing central axis H. The flow facing deflecting surface 206 is angled relative to an inner face 34 of the housing sidewall 26 at a first deflection angle θ1 and the opposite deflecting surface 208 is angled relative to the inner face 74 of the housing sidewall 76 at a second deflection angle θ2.

In the illustrated embodiment, each deflector 200 is symmetrical about a symmetry axis S which extends along a radius of the housing 60. In this embodiment, the first deflection angle θ1 is therefore substantially equal to the second deflection angle θ2. In one embodiment, the first and second deflection angles θ1, θ2 may be equal to about 1 degree to 89 degrees, and more specifically to about 30 degrees to 60 degrees. Alternatively, the deflector 200 may not be symmetrical and the first and second deflection angles θ1, θ2 may be different from each other.

In the illustrated embodiment, the apex 210 of each deflector 200 is spaced radially inwardly from the inner face 74 of the housing sidewall by a radial distance of about 7¾ inches or about 20 cm. Still in the illustrated embodiment, the apex 210 is further spaced radially outwardly from a tip 130 of the rotor arms 122 by a radial distance of between about ½ inch or about 1 cm and about 2 inches or about 5 cm. In one embodiment, the radial distance or "clearance space" between the tip 130 of the rotor arms 122 and the apex 210 may be selected such that the vortices V may be formed as desired when the rotatable shaft 106 is rotated.

Alternatively, the deflectors 200 could be differently shaped and/or sized. For example, the flow facing deflecting surface 206 and the opposite deflecting surface 208 may not be planar, but may instead be curved. In another embodiment, the deflectors 200 may not comprise an opposite deflecting surface 208. In yet another embodiment, instead of being wedge-shaped, the deflectors 200 may instead have a rectangular cross-section, or may have any other shape and size which a skilled person would consider suitable.

FIG. 10 is a schematic representation of the vortices V generated within the interior chamber 68 when the pulverizer 50 is in operation.

During operation of the pulverizer 10, the rotatable shaft 106 is rotated about the housing axis H such that the rotor arms 122 form the circular airflow revolving about the housing axis H. In the example illustrated in FIG. 10, the rotatable shaft 106 is rotated in a clockwise direction when viewed from above to form a counterclockwise airflow in the interior chamber 68.

The rotatable shaft 106 may be rotated at relatively high speed to provide the desired pulverizing effect in the pulverizer. In one embodiment, the rotatable shaft 106 is rotated at a rotation speed of between about 500 rpm and about 1200 rpm, and more specifically at a rotation speed of between about 700 rpm and about 1100 rpm, or between about 1000 rpm and about 1100 rpm. Alternatively, the rotatable shaft 106 may be rotated at a different rotation speed that would allow the formation of the vortices as described below. As is understood by the skilled person, the rotation speed of the rotatable shaft 106 can be adjusted to produce a desired particle size of the size-reduced fraction and/or the prevent or reduce size reduction of the ductile and/or infrangible material in the oversized fraction.

The airflow travels generally along the inner face 34 of the housing sidewall 66, but is interrupted by the flow facing deflecting surface 206 of the deflectors 200, which cooperates with the rotor arms 122, and more specifically with the tip of the rotor arms 122 to form the vortices V. As shown in FIG. 10, the vortex V may further be guided back inwardly towards the central housing axis H by an adjacent deflector 200'.

Still referring to FIG. 10, each vortex V further overlaps at least one adjacent vortex V1, V2 to cause input material particles in suspension in the vortex V to collide with input material particles in suspension in the adjacent vortex or vortices V1, V2. More specifically, each vortex V created generally includes an outwardly moving portion 500 defined generally by airflow circulating from the shaft 106 towards the housing sidewall 66 and an inwardly moving portion 502 defined generally by airflow circulating from the housing sidewall 26 towards the shaft 106. As shown in FIG. 10, the outwardly moving portion 500 of each vortex V overlaps the inwardly moving portion 502 of a first adjacent vortex V1, and the inwardly moving portion 502 of each vortex overlaps the outwardly moving portion 500 of a second adjacent vortex V2.

In this configuration, the input material particles in the vortex therefore collide with input material particles moving at twice the movement speed of the particles in the vortex V. For example, in one embodiment, the vortices V, V1, V2 are rotating at about a third of the speed of sound. When input material particles from the first and second adjacent vortices V1, V2 collide with the input material particles in suspension in the vortex V, which move at the same speed but in the opposite direction, the particles will collide with each other at about two thirds of the speed of sound.

In one embodiment, in addition to the collision of the input material particles via the airflow and vortices V, the input material may further be pulverized by the rotor arms 122 impacting the input material particles in the interior chamber 68 as the rotatable shaft 106 is rotated. In this embodiment, the combined effect of the input material particles impacting each other in the overlapping vortices V, V1, V2 and of the rotor arms 122 impacting the input material particles may increase the efficiency of the pulverizer. Moreover, since the overlapping vortices V cause the particles to impact each other rather than surfaces inside the housing 20, the wear of the components inside the housing 20 may be reduced.

Figure 9:
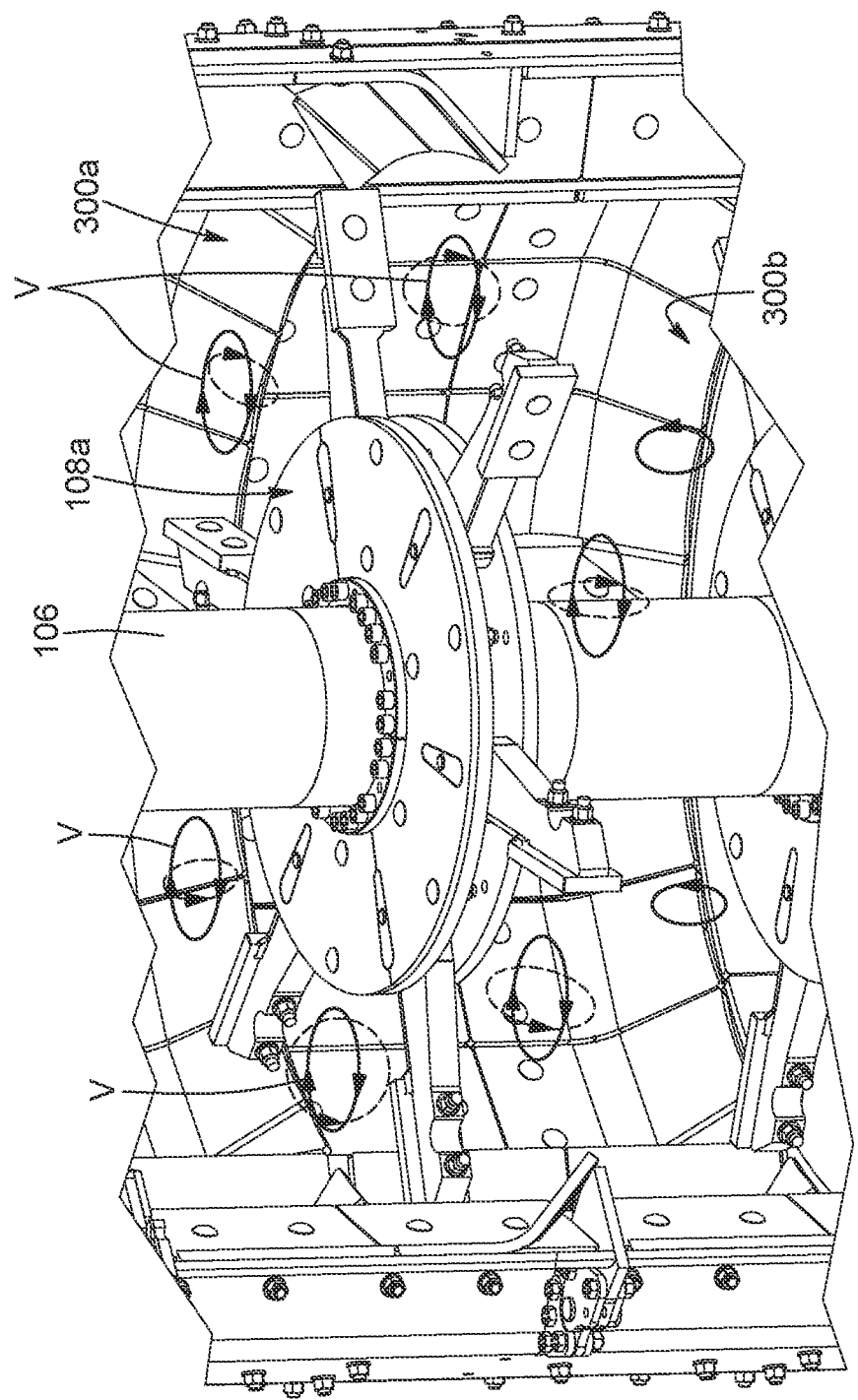
FIG. 9 is a partially sectioned view of a pulverizing rotor mounted within the housing for the pulverizing apparatus illustrated in FIG. 2, showing the vortices created within the housing.

It will be understood that the vortices V illustrated in FIGS. 9 and 10 have been simplified for ease of understanding and that in practice, the vortices V may not be exactly circular as illustrated or be exactly located as indicated in FIG. 10.

In the illustrated embodiment, the pulverizer 50 further includes a plurality of shelves 300a, 300b which extend inwardly from the housing sidewall 26. Specifically, the plurality of shelves 300a, 300b includes an upper shelf 300a and a lower shelf 300b spaced downwardly from the upper shelf 300a. Each shelf 300a, 300b extends circumferentially around the housing axis H and along the housing sidewall 26. It will be understood that the shelves therefore extend substantially orthogonally to the deflectors 200. Specifically, the deflectors 200 extend generally parallel to the housing axis H and can therefore be said to extend in an axial direction relative to the housing 60, while the shelves can be said to extend in an azimuthal direction relative to the housing 60. In the illustrated embodiment, the deflectors 200 extend generally vertically while each shelf 300a, 300b is disposed in a generally horizontal plane and therefore extend generally horizontally.

Still in the illustrated embodiment, each shelf 300a, 300b extends substantially continuously around the housing sidewall 66. Alternatively, the shelves 300a, 300b may not extend continuously around the housing sidewall 66 and could instead include a plurality of shelf segments spaced from each other to define gaps between adjacent shelf segments.

In the illustrated embodiment, the upper shelf 300a is substantially horizontally aligned with the upper pulverizing rotor 108a and the lower shelf 300b is substantially horizontally aligned with the intermediate pulverizing rotor 108c. Alternatively, each shelf 300a, 300b could be located slightly below the corresponding pulverizing rotor 108a, 108c.

In the illustrated embodiment, each shelf 300a, 300b includes a top shelf face 302 which extends downwardly and away from the housing sidewall 66. Specifically, since the shelf 300a, 300b extends along the housing sidewall 66 and around the housing axis H, the top shelf face 302 is substantially conical. Still in the illustrated embodiment, the top shelf face 302 is angled relative to the housing sidewall 66 at an angle of between about 1 degree, where the top shelf face 302 would be almost flat against the housing sidewall 66, and about 89 degrees, where the top shelf face 302 would be almost orthogonal to the housing axis H. In one embodiment, the top shelf face 302 could be angled relative to the housing sidewall 66 at an angle of between 30 degrees to 60 degrees.

The shelves 300a, 300b are configured to deflect the airflow directed towards the shelf upwardly. This allows the input material particles to be temporarily maintained in suspension above the shelf 300a, 300b. The input material particles can therefore be subject to the effect of the vortices and to pulverization by impact with the rotor arms 122 for a longer period of time, resulting in additional reduction in the size of the input material particles as they travel downwardly towards the next rotor stage or towards the outlet 72.

The upward deflection of the airflow may further contribute to the vortices V within the interior chamber 68. More specifically, as shown in FIG. 9, the vortices V may rotate in a plane generally parallel to the housing axis, i.e., upwardly-downwardly, in addition to rotating in a plane orthogonal to the housing axis H as illustrated in FIG. 10. The combined effect of the shelves 300a, 300b and the deflectors 200 therefore contribute to forming vortices V which are tridimensional such that air within the vortices V moves along a tridimensional path of travel, which may further promote collisions between the input material particles of adjacent, overlapping vortices V.

This configuration further allows the number of vortices V generated by the deflectors 200 to be multiplied by the number of shelves 300a, 300b in the housing 60. For example, in the illustrated embodiment, the pulverizer 50 includes six deflectors 200 which can form six vortices above each shelf 300a, 300b, for a total of 12 vortices in the entire interior chamber 68.

The pulverizer can be designed and sized to handle the feedstock for one-pass processing. For example, the pulverizer can be sized to handle 5 to 20 tonnes per hour, or 10 to 15 tonnes per hour, of a C&D debris stream that comprises a mixture of components as described above, while operating as a one-pass unit with a rotation speed between 500 RPM and 1,200 RPM to produce one or more of the output sized streams as described herein.

Multiple Feedstock Streams

Figure 11:
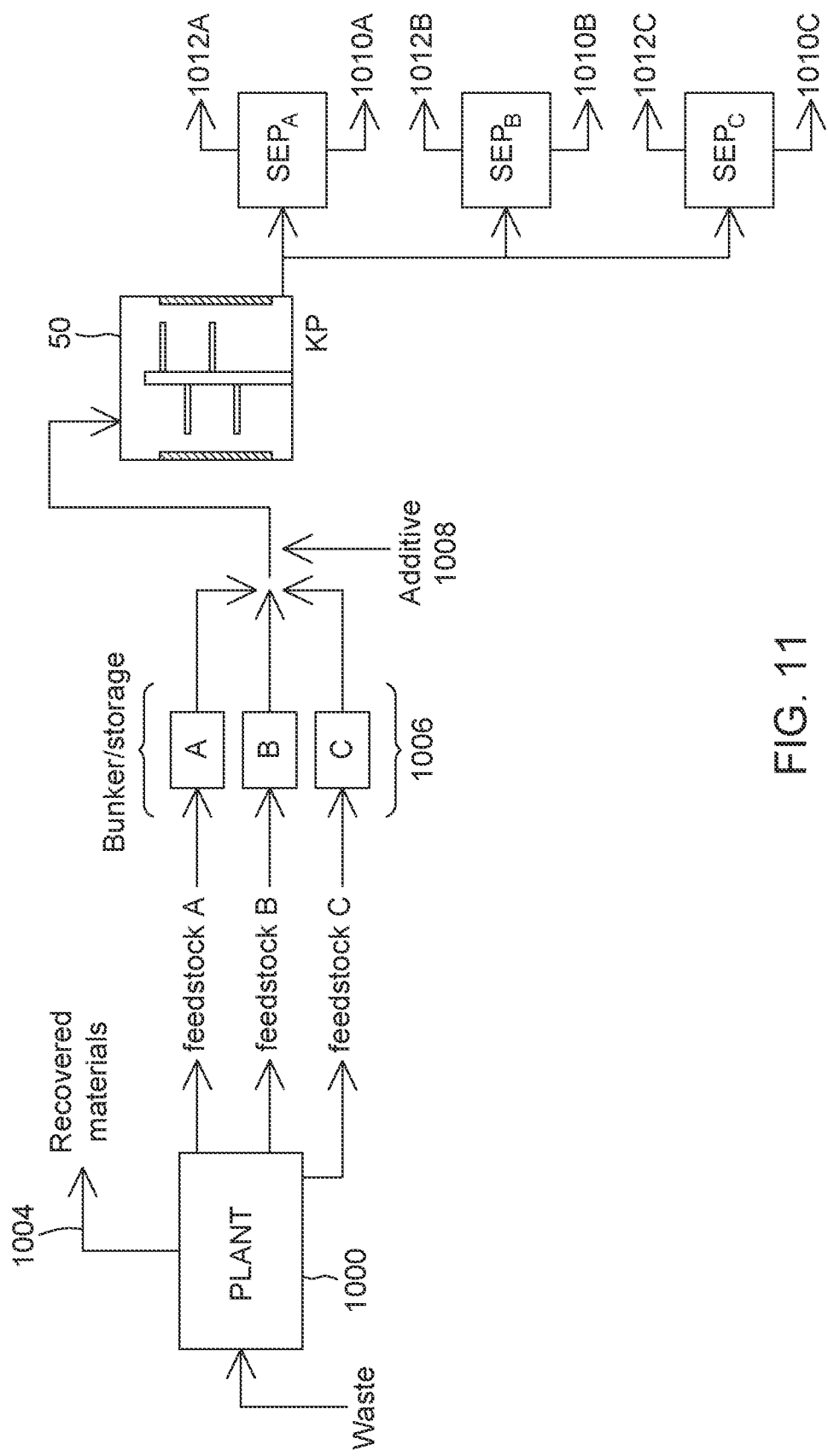
FIG. 11 is a process flow diagram for treating multiple C&D streams, such as a stream A of asphalt shingles, a stream B of drywall panels, and a C&D fines stream C, each obtained by subjecting the C&D source materials to a pre-sorting stage, and using kinetic pulverization followed by separation on the streams to produce an end product.

Referring now to FIG. 11, it is also possible to provide a kinetic pulverizer 50 for one-pass operation and capable of processing various different feedstocks with no operational changes or with changes only related to rotation speed and/or feed rate. For instance, the kinetic pulverizer 50 could be implemented in a large plant 1000 that generates multiple different feedstocks A, B, C to pulverize the feedstocks at different times and produce respective output streams that can be subjected to separation, which may occur in one screen or in respective screens that are designed for the given feedstock and end product to produce. Thus, a single kinetic pulverizer 50 along with one or more screens could be implemented in a plant that generates multiple residual feedstocks A, B, C to facilitate production of various end products.

FIG. 11 shows a plant 1000 that receives construction and/or demolition debris 1002 and generates recovered materials 1004, as well as at multiple feedstock streams A, B, C that are supplied to respective bunkers or storage locations 1006. The feedstock streams A, B, C, can individually be subjected to a kinetic pulverization stage using the kinetic pulverizer 50 and batch processed. In some implementations, one or more of the feedstocks A, B, C can be combined with a friable additive 1008 prior to or concurrently with being supplied to the kinetic pulverizer 50. In some embodiments, the friable additive 1008 can include a porosity agent, a soil additive, a building material additive, a compost additive, peat moss, and a glass product additive. The friable additive 1008 can be included to assist in the size-reduction of the frangible material and/or to homogenize with the pulverized frangible material to produce an end product.

The kinetic pulverizer 50 generates a pulverized output stream that is supplied to a corresponding screen A, B or C to produce the corresponding size-reduced material. In this manner, a single pulverizer can be used to upgrade multiple feedstocks generated by a construction and demolition material recovery plant 1000.

For example, in some implementations, the construction and/or demolition debris 1002 can undergo an upstream separation stage, such as a magnetic separation stage and/or a manual sorting separation, to remove large metal objections and reusable materials, such as metal beams, large intact timbers, reclaimed wood, reusable building materials, cardboard, glass, asphalt shingles, drywall panels, etc. The wood products, asphalt shingles, and/or drywall panels can be sorted into an individual feedstock stream, such as feedstock A or B. The remaining materials or residuals can be separating into a C&D fines feedstock C. For example, feedstock A can include asphalt shingles made of a ductile fiberglass or cellulose (paper) underlayer coupled to the frangible asphalt and mineral granules and, optionally, infrangible metal fasteners. Feedstock B can include recovered drywall sheets that are made of frangible gypsum (calcium sulfate dihydrate) and other additives such as mica, clay, and resin, a ductile paper film, and infrangible metal fasteners, such as drywall screws. Feedstock C can include a C&D fines stream that contains a variety of building material particulates, including frangible materials, ductile materials, and infrangible materials.

The individual streams of feedstocks A, B, and C, can be provided to the kinetic pulverizer 50 consecutively, with no operational changes or with changes only related to rotation speed and/or feed rate. Consideration should be given to contaminants left in the kinetic pulverizer 50 when switching between streams of the different feedstocks A, B, and C. For example, if feedstock B follows a kinetic pulverization stage of feedstock A, asphalt contaminants can enter the frangible gypsum product. In some implementations, contaminants can be prevented by removing the pulverized output stream from feedstock B for the first approximately 15 to 20 minutes of processing. In other implementations, the kinetic pulverizer 50 can undergo a cleaning stage between batch feeds of the feedstocks A, B, or C.

In some instances, the size-reduced fraction (i.e., the pulverized frangible material), the ductile material, and/or the infrangible material in the oversized fraction can be recovered as an end product. In the exemplary embodiment, separation of feedstock A $SEP_A$ produces a size-reduced stream 1010A that includes asphalt and mineral granules that can be reused, for example in asphalt pavement, and optionally, smaller infrangible components, and an oversized stream 1012A that includes a ductile fraction (i.e., the fiberglass or cellulose underlayer), and optionally, larger infrangible components. Separation of feedstock B $SEP_B$ produces a size-reduced stream 1010B that includes gypsum, mica, clay, and resin that can be reused, for example to produce cement, as a soil additive and/or fertilizer, or to manufacture new drywall, and optionally, smaller infrangible components, and an oversized stream 1012B that includes a ductile fraction (i.e., the paper film) and, optionally, an infrangible fraction (i.e., metal fasteners, which can be recycled or sold as metal scrap). Separation of feedstock C $SEP_C$ produces a size-reduced stream 1010C that includes a micronized C&D fines product that can be reused, for example as ADC or non-structural fill, and optionally, a small infrangible component, and an oversized stream 1012C that includes a ductile fraction (i.e., paper or plastic films, insulation fibers, rope, wet wood, etc.) and, optionally, an infrangible fraction (i.e., metal fasteners, which can be recycled or sold for scrap metal).

In some embodiments, the size-reduced streams 1010A, 1010B, and 1010C and/or the oversized streams 1012A, 1012B, and 1012C can be subjected to a secondary separation stage comprising metal separation, as described herein, to remove the small and large infrangible components from the size-reduced and oversized streams. The infrangible material can then be recycled or sold as scrap metal.

Metal Separation Stage

Figure 12:
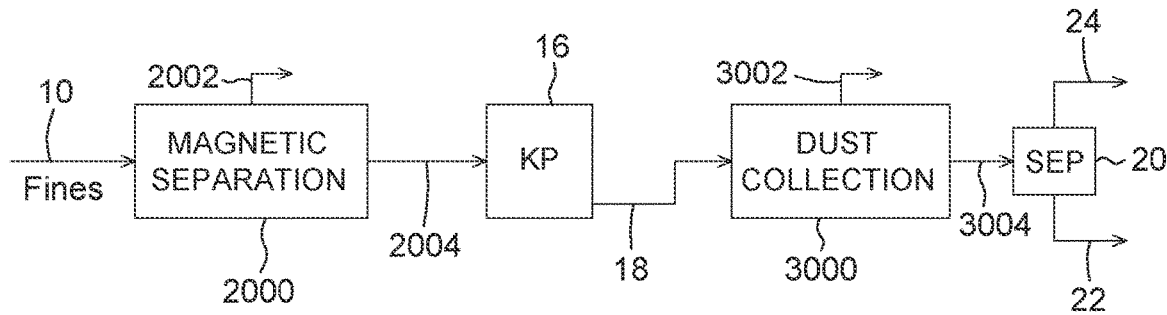
FIG. 12 is a process flow diagram for treating a waste stream using kinetic pulverization followed by screening, and also including a magnetic separation stage and a dust collection stage.

Referring now to FIG. 12, in some embodiments the process includes a metal or magnetic separation stage 2000 upstream of the kinetic pulverization stage 16 to capture metal from the feedstock 10. The separated metal 2002 can be supplied as scrap metal for resale, recycled, or disposed of. In some embodiments, the magnetic separation stage 2000 can include magnets to separate ferrous metals from the feedstock 10 and/or a non-ferrous metal separator to separate non-ferrous metals with permanent magnets.

The metal depleted feedstock 2004 can be fed to the kinetic pulverization stage 16. The magnetic separator can be designed and operated to remove metal with a high weight density to reduce wear and damage on the kinetic pulverizer. For example, the magnetic separator can be provided based on nominal size of the feedstock and ferrous objects that would be desirable for removal. For instance, the magnetic separator can be provided to ensure removal of solid ferrous objects that have a high weight in an overall low volume. While some geometries, such as flat sheets, may pose little concern to the operation of the kinetic pulverizer 50, other geometries such as blocks, chunks, and the like can increase wear and damage and thus the magnetic separation stage 2000 facilitates removal to enhance downstream processing. The magnetic separator can be configured based on size of the feedstock, ferrous object size, and material burden depth. The magnetic separator could be actively controlled or simply turned on to enable the separation. The magnetic separation stage 2000 facilitates reduced risk of wear and damage to the kinetic pulverization stage 16, and also diverts more waste from going to the landfill by recovering scrap metal material.

In some implementations, the magnetic separation stage 2000 can be downstream of the kinetic pulverization stage 16 to remove the infrangible material from the pulverized output stream 18, the size-reduced stream 22, and/or the oversized stream 24. For example, small fragments of metal that cannot be separated from the size-reduced fraction with mechanical screening can be removed with a downstream magnetic separation stage 2000. When the feedstock 10 includes infrangible materials that are embedded in frangible materials, such as nails or screws embedded in shingles or drywall panels, the infrangible metal material can be removed with a downstream magnetic separation stage 2000. When the oversized stream 24 includes both ductile materials and infrangible materials, the infrangible material can be separated from the ductile material with a downstream magnetic separation stage 2000. In some implementations, the process can include upstream and downstream magnetic separation stages 2000.

The magnetic separation stage 2000 can use various types of magnetic separators which can be selected based on the feedstock and throughput. For example, the magnetic separator can be a dry-type magnetic separator or wet type magnetic separator depending on the moisture content of the feedstock. The magnetic separator can have a magnetic field strength that is designed for removal of target ferrous metal objects that could be problematic for the kinetic pulverization stage 16. The magnetic separator could also include a permanent magnet and electromagnetic magnetic separator. The magnetic separator can also have various design and structural features, e.g., drum type, roller type, disc type, ring type, belt type, among others. The magnetic separator can also use constant, alternating, pulsating, or rotating magnetic fields depending on the design and configuration of the system and the feedstock. The magnet itself can be composed of various materials.

While magnetic separation is a preferred mechanism to remove metals from the feedstock, there are various other metal removal methods that could be used instead of or in addition to magnetic separation. An additional metal removal stage could be designed to remove non-ferrous metals, for example, particularly metal debris that has a high weight density and are thus relatively heavy and thick. In some implementations, the metal removal method (e.g., magnetic separation) is performed to remove all metal debris having an average diameter of 1 inch or greater. Metal debris that is lump shaped or elongated is removed, while metal debris that has a flat sheet shape is optionally removed.

Figure 13:
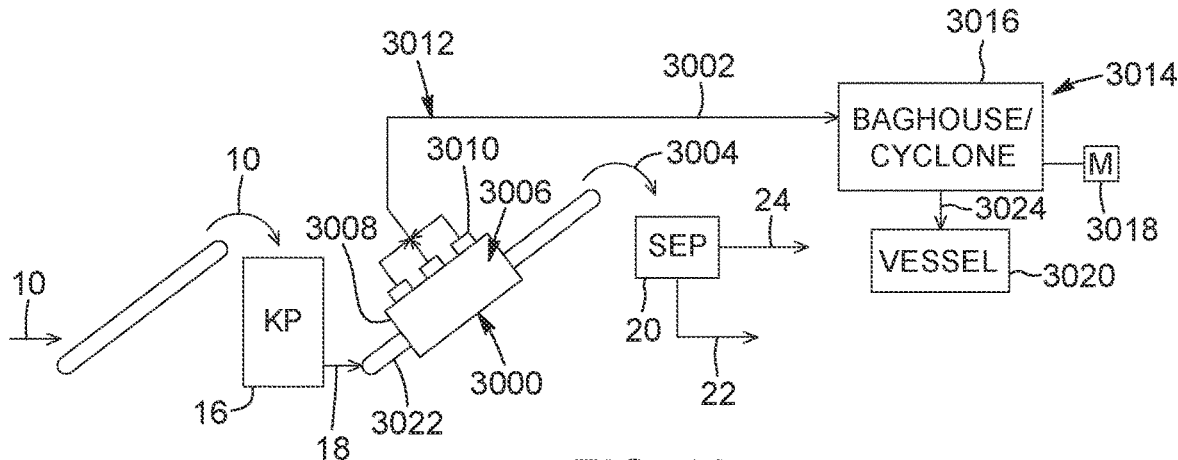
FIG. 13 is a process flow diagram for treating a waste stream using kinetic pulverization followed by screening, and also including a dust collection stage.
Figures 14, 15:
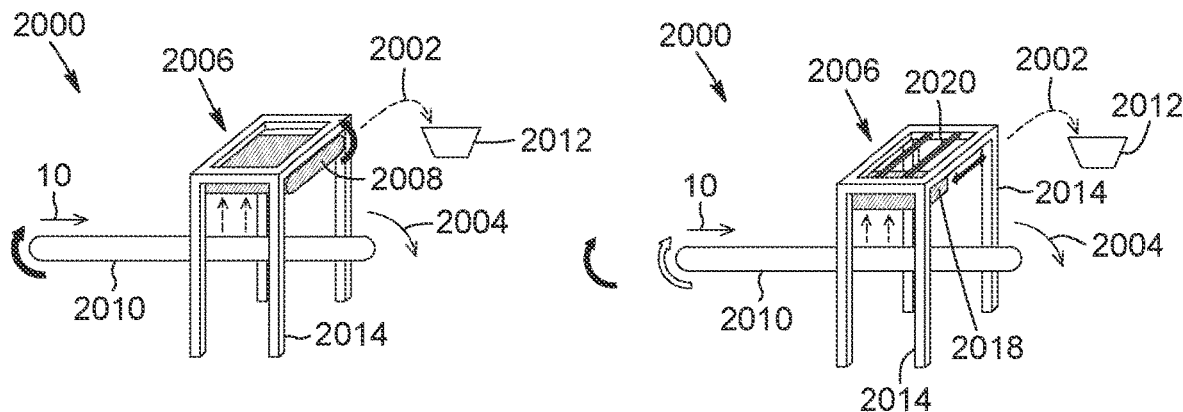
FIG. 14 is a side view schematic of an example magnetic separation stage.
FIG. 15 is a side view schematic of another example of a magnetic separation stage.

Referring now to FIGS. 13 and 14, two example configurations are shows for the magnetic separation stage 2000. FIG. 13 shows a belt magnetic separator 2006 including a self-cleaning magnetic belt 2008 that is above a conveyor 2010. The magnetic belt 2008 discharges the ferrous metals into a bin 2012. The magnetic belt 2008 can be mounted to a magnet frame 2014 that spans across the conveyor 2010, such as an infeed conveyor and/or an outfeed conveyor. FIG. 14 shows an alternative configuration including a stationary magnet 2018 on rails 2020 mounted above the conveyor 2010 and configured to move back and forth.

Dust Collection Stage

Referring back to FIG. 12, the process can also include a downstream dust collection stage 3000 for recovering dust that is part of the pulverized output stream 18 exiting the kinetic pulverization stage 16. The pulverized output stream 18 enters the dust control stage 3000, which recovers a dust stream 3002 and produces a dust reduced pulverized stream 3004 that is fed to the separation stage 20. The dust collection stage 3000 facilitates dust control and can include various units, such as a settling chamber and a baghouse or cyclone filtration unit.

Referring to FIG. 13, the dust collection stage 3000 can include a dust collector 3006 that is coupled to the exit of the kinetic pulverization stage 16 and may include a settling chamber 3008 that has dust outlets 3010 positioned on its top. The dust outlets can be in fluid communication via ducting 3012 to a dust recovery unit 3014 that includes a baghouse or cyclone filtration unit 3016 having a dedicated motor 3018. The dust recovery unit 3014 can also include a dust recovery vessel 3020 that receives the dust from the baghouse or cyclone filtration unit, for example via a hopper.

The settling chamber 3008 can receive all of the output from the kinetic pulverization stage 16 and thus receives relatively fine particles that are deposited on an outfeed conveyor 3022 so that the fines are added to the diverted output. Fine particles settle on the outfeed conveyor 3022, while very fine dust particles are accumulated and withdrawn from the settling via the dust outlets 3010. The settling chamber 3008 can extend over a part or the entire length of the outfeed conveyor 3022 depending on the process design and the target level of dust control. The settling chamber 3008 can be in communication with the outlet of the kinetic pulverizer via a flexible tubular member as the kinetic pulverizer can experience vibration.

The quantity of dust in the pulverized output stream 18 is highly dependent upon the type and dryness of the feedstock supplied to the kinetic pulverization stage 16. For instance, output diversion rates as high as about 30% have been observed for some feedstocks. In some embodiments, the feedstock 10 can undergo a surface wetting pretreatment step to increase the moisture content and help reduce the amount of dust being produced. After the moisture content of the feedstock 10 has been increased, the pulverizing stage reduces the moisture, therefore requiring an addition dust collecting stage 3000.

It is noted that the power and suction of the dust collection stage 3000 can be adjusted to increase the amount of material capture in the dust collector. For example, the dust recovery unit 3014 can be controlled to provide a desired suction in the dust collector 3006. Therefore, the dust collection stage 3000 can be designed and operated to be a tool in the separation of the outbound material from the kinetic pulverization stage 16, such as separating small and low-density frangible material from larger or more dense frangible materials. For example, when processing demolition debris that includes wood and drywall, the dust collection stage 3000 could be used to separate the fine or silt-like particles of pulverized gypsum from the larger pulverized wood (i.e., wood chips). It is also noted that the dust collector 3006 can also pick up some ductile materials, such as paper or plastic film pieces, which are relatively light, and such ductile materials can therefore be separated by both or either of the separate stage 20 and the dust collection stage 3000. In some implementations, after asphalt shingles have been processed in the kinetic pulverization stage, the dust collection 3000 can be used to separate up to 50% of the resulting frangible asphalt component in the size-reduced fraction from the oversized fraction.

Still referring to FIG. 13, the baghouse filtration or cyclone filtration 3016 traps finer and lighter material, which can be stored in the vessel 3020. This fine recovered material 3024 can be added back into the diverted output stream, disposed of and/or kept as a fines product for sale. The fine recovered material 3024 can be recycled back into one or more stages of the system. In some embodiments, the fine recovered material 3024 would be supplied into the dust reduced stream 3004 or the size-reduced stream 22, or would be kept as a distinct product stream that could be sold or mixed with other materials to provide a commercial product. It is noted that the recovered dust material can be treated, transported, and used in various ways, some of which are described herein.

Experimentation

Kinetic Pulverizer Compared with Grinder

Comparative experiments were conducted on an MRF fines material obtained from a municipal solid waste (MSW) processing plant. The MRF fines taken as feedstock was below 2½ inch material and samples were subjected to size reduction in a kinetic pulverizer as described herein as well as in a grinder device (Rotochopper®). The size-reduced material was then subjected to ½ inch screening to obtain a screened fraction and an oversized reject fraction. A vibration screen was used for the comparative tests.

In terms of observations and results, the quality and the yield of the screened fraction when using the kinetic pulverizer were notably higher compared to the grinder device. In addition, with the kinetic pulverizer, less organic material was found in the reject oversized fraction compared to the grinder device.

For example, with the kinetic pulverizer, the rejects in the screened fraction represented a percentage of 11%, compared to 21% with the grinder. This means that undesirable materials were excessively size reduced by the grinder such that they tended to pass through the screen with the desirable material, such that the quality of the product was inferior compared to the kinetic pulverizer. In contrast, the kinetic pulverizer facilitated liberation and separation of such undesirable materials resulting in a higher quality screened product. In the tests, the kinetic pulverizer facilitated production of a screened fraction with almost half the amount of undesirable materials compared to the grinder tests.

In addition, with the kinetic pulverizer, the proportion of man-made objects, such as glass, ceramic, plastics, etc., in the reject material was 4.5%, compared to 8.1% with the grinder. This indicates that the kinetic pulverizer was able to size reduce hard man-made materials for inclusion in the screened fraction, whereas the grinder was unable to achieve such size reduction, resulting in a greater weight percentage of man-made objects in the oversized fraction.

Thus, the kinetic pulverizer was able to size reduce organics and hard man-made objects such that almost 90% of the input MRF fines was size reduced and included in the screened product fraction. With the kinetic pulverizer, very little organics were lost to the oversized fraction, thus providing enhanced organics recovery for the final product.

The follow table provides a more detailed overview of the comparative test results with size distribution and contaminant composition data. The test results confirm that the use of the kinetic pulverizer for processing feedstocks such as MRF fines facilitates several advantages.

| Results | Kinetic Pulverizer | | Grinder | |
|---|---|---|---|---|
| | Size reduced material before screening | Screened fraction | Size reduced material before screening | Screened fraction |
| Physical contaminants (%) | | | | |
| Total plastic > 4 mm | 2.2 | 0.4 | 1.1 | 1.6 |
| Film plastic > 4 mm | 0.63 | <0.1 | 0.4 | 0.4 |
| Glass > 4 mm | 0.43 | 0.81 | 2.4 | 2.1 |
| Metal > 4 mm | <0.1 | <0.1 | <0.1 | <0.1 |
| Sharps > 2 mm | Not detected | Not detected | Not detected | Not detected |
| Total | 2.6 | 1.21 | 3.5 | 3.7 |
| Size distribution (%) | | | | |
| >50 mm | 0.0 | 0.0 | 0.0 | 0.0 |
| 25-50 mm | 0.0 | 0.0 | 0.0 | 0.0 |
| 16-25 mm | 1.7 | 0.0 | 0.0 | 0.0 |
| 9.5-16 mm | 4.1 | 0.4 | 9.2 | 4.7 |
| 6.3-9.5 mm | 4.2 | 3.3 | 15.3 | 15.2 |
| 4.0-6.3 mm | 6.1 | 5.2 | 22.3 | 20.4 |
| 2.0-4.0 mm | 27 | 16.1 | 28.5 | 30.1 |
| <2.0 mm | 56.9 | 75.0 | 24.7 | 29.5 |

As can be noted from the table, the kinetic pulverizer enabled a size distribution with much high proportions of smaller particles compared to the grinder. For example, with the kinetic pulverizer, 75% of the screened material had a particle size below 2 mm, whereas only 29.5% of the screened fraction from the grinder was below 2 mm. In addition, the proportion of total plastics decreased due to screening of the kinetic pulverizer size reduced material, whereas the proportion of total plastics increased for the grinder size reduced material. The film plastics were significantly reduced from screening for the kinetic pulverizer size reduced material as the film plastics were liberated rather than overly size-reduced, whereas the proportion of film plastics stayed the same after screening the grinder size reduced material. In general, the contaminant concentrations were lower when using the kinetic pulverizer for the size reduction stage.

Physical Characterization of C&D Fines after Kinetic Pulverization Stage

Figures 16A, 16B:
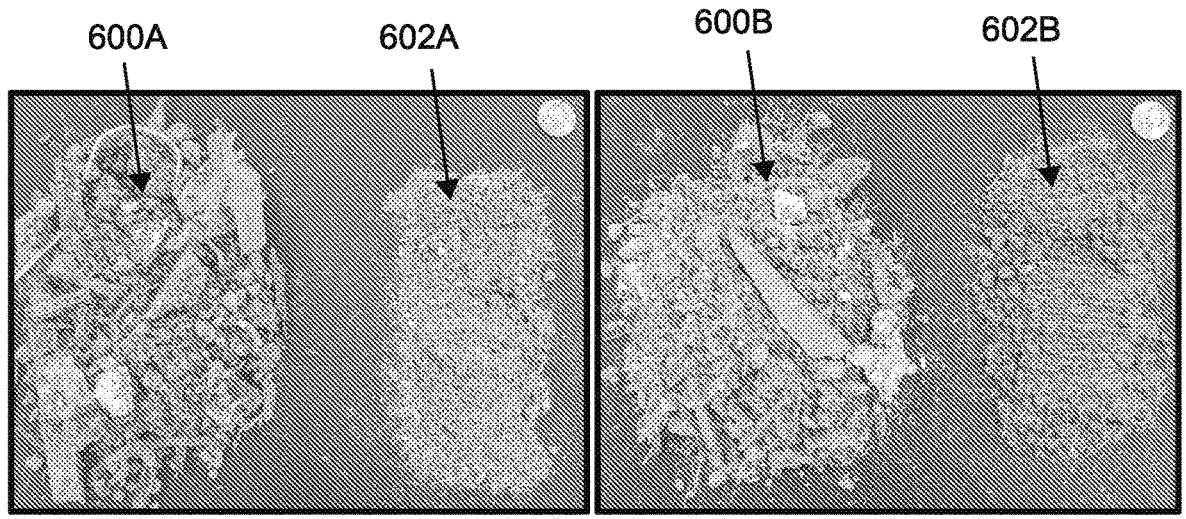
FIG. 16A is a photographic view of an example C&D fines stream before the kinetic pulverization stage (left) and a resulting example pulverized frangible material after the kinetic pulverization stage (right)
FIG. 16B is a photographic view of an example C&D fines stream before the kinetic pulverization stage (left) and a resulting example pulverized frangible material after the kinetic pulverization stage (right)

Referring now to FIGS. 16A and 16B, C&D fines streams 600A and 600B are shown before the kinetic pulverization stage (left) and pulverized frangible material is shown after the kinetic pulverization stage (right). The C&D fines streams 600A and 600B includes screenings from an MRF as well as small reject portions that are around 2 to 4 inches. The C&D fines streams 600A and 600B were subjected to a kinetic pulverizer stage to produce a pulverized output stream. The pulverized output stream of C&D fines streams 600A and 600B underwent separation stages to remove the ductile materials and infrangible materials and produce a pulverized frangible material 602A and 602B, respectively. As can be seen, the pulverized frangible material 602A and 602B is a homogenous, fine, uniform material that resembles dirt and can be used as an ADC, soil replacement, filler, etc.

Figure 16C:
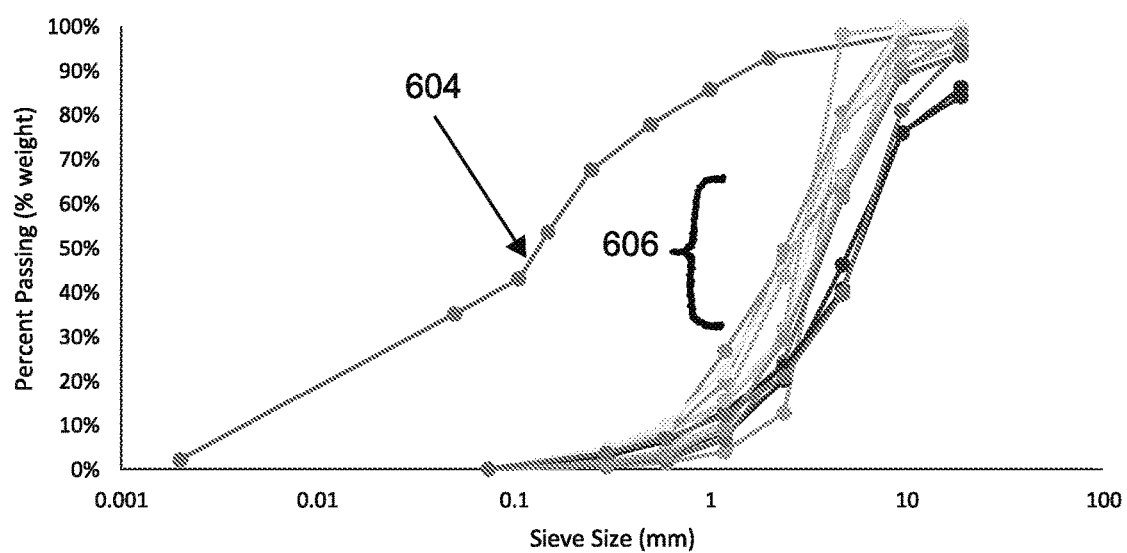
FIG. 16C is a graphical representation of the percentage of the pulverized frangible material that passed through sieves ranging in size from 0.01 mm to 10 mm.

Referring now to FIG. 16C, a graph comparing the particle size of the pulverized frangible material 604 to the particle size of non-pulverized C&D fines 606 is shown. The particle size of the non-pulverized C&D fines 606 was determined by the Construction & Demolition Recycling Association (CDRA) in a 2017 report entitled "Characterization of Fines from US Construction and Demolition Materials Recycling Facilities" after size classifying C&D fines from 12 different construction and demolition debris recycling facilities. As can be seen, the particle size of pulverized frangible material 604 according to the present description is significantly smaller than the particle size of unprocessed or non-pulverized C&D fines 606. More than 30% of the pulverized frangible material passed through a sieve that is less than 0.1 mm in diameter and more than 90% passed through a sieve that is 2.0 mm in diameter (#10 sieve), whereas only between about 5% and 30% of the non-pulverized C&D fines 606 passed through a 2 mm sieve.

EXAMPLES

The methods and processes described herein can be used to produce a number of end products that can be used in a variety of applications.

C&D Fines

As shown in FIGS. 16A and 16B, the methods and process described herein produce a micronized C&D fines product that can be used as a soil alternative, such as non-structural fill, as ADC, or other land-based uses. In some implementations, additives can be added to the kinetic pulverizer separately or concurrently with the C&D fines stream feedstock to produce a homogenized end product. For example, the micronized C&D fines product can be homogenized with a recycled concrete aggregate (RCA), which can optionally be sourced from the same C&D debris supply as the C&D fines stream (i.e., the concrete/brick/block source separated stream 440 referred to in FIG. 1A). In some embodiments, the RCA can be mixed with the micronized C&D fines product produced by the methods described herein at 60/40, 70/30, and 80/20 ratios for use as a structural or non-structural fill.

Drywall 6,000 pounds of gypsum drywall sourced from a construction site was processed through a kinetic pulverizer according to the methods described herein. The kinetic pulverizer was operated with rotational speeds of 700, 800, and 975 rpm to produce a mixed pulverized gypsum product and a recycled paper product. A sample of the pulverized gypsum product and recycled paper product was collected for each rotational speed and underwent a separation stage using consecutive screening with 19 mm, 6.3 mm, 4 mm, and 2 mm sieves. The resulting sieved products were weighed and the following size distributions were as shown in the following table.

| Fraction | Raw | Recycled Paper >19 mm | Gypsum Product 6.3 to 19 mm | 4 to 6.3 mm | 2 to 4 mm | <2 mm | Losses |
|---|---|---|---|---|---|---|---|
| 700 RPM Sample | | | | | | | |
| Weight (lbs) | 19.875 | 2.45 | 1.225 | 0.26875 | 0.79375 | 14.7875 | 0.35 |
| % of raw sample | | 12.3% | 6.2% | 1.4% | 4.0% | 74.4% | 1.8% |
| 800 RPM Sample | | | | | | | |
| Weight (lbs) | 16.83125 | 1.76875 | 1.25625 | 0.2125 | 0.48125 | 13.10625 | 0.00625 |
| % of raw sample | | 10.5% | 7.5% | 1.3% | 2.9% | 77.9% | 0.04% |
| 975 RPM Sample | | | | | | | |
| Weight (lbs) | 15.6125 | 0.90625 | 1.6125 | 0.26875 | 0.30625 | 12.4875 | 0.03125 |
| % of raw sample | | 5.4% | 9.6% | 1.6% | 1.8% | 74.2% | 0.19% |

The samples processed at 700 rpm have the greatest loss (1.8%) when compared to samples processed at 800 (0.04%) or 975 (0.19%). Furthermore, the overall concentration of micronized (<2 mm in size) gypsum increased when the kinetic pulverizer is operated at 800 rpm (77.9), with the samples processed at 700 rpm and 975 rpm being only 74.4% and 74.2%, respectfully. Although having an operating speed of 800 rpm accounted for a larger fraction of pulverized gypsum and smaller overall loss, consideration should be given to the size of the recovered ductile material, in this case the paper underlayer. The results showed that when the kinetic pulverizer was operated at 700 rpm, substantial liberation/size reducing of the gypsum was achieved (74.4% under 2 mm, 4.0% between 2 and 4 mm, and 1.4% between 4 and 6.3 mm) without reducing the paper as small (12.3% of the output product was paper over 19 mm compared to only 10.5% or 5.4% when the kinetic pulverizer was operated at 800 rpm and 975 rpm, respectively). It is theorized that operation of the kinetic pulverizer at 700 rpm reduces the overall amount of fiber in the recovered gypsum, which can result in a purer gypsum end product, without reducing the cleanliness of the recovered paper product.

The gypsum end product produced by the methods described herein can be used for a number of applications, including as an agriculture amendment, particularly for calcium and sulfur-loving crops, such as peanuts, or as an additive in cement product. In some implementations, the methods described herein can produce a substantially pure gypsum product that it can be used in the production of new gypsum drywall.

The invention claimed is:

1. A process for treating construction and/or demolition (C&D) debris comprising:
   providing a C&D fines stream comprising a frangible material and a ductile material;
   providing a kinetic pulverizer comprising a pulverizing rotor assembly disposed within an interior chamber, wherein the pulverizing rotor assembly is configured to rotate to form vortices that subjects the C&D fines stream to self-collisions within the interior chamber;
   subjecting the C&D fines streams to a kinetic pulverization stage wherein the C&D fines stream is fed into the kinetic pulverizer to produce a pulverized material comprising a size-reduced fraction derived from the frangible material and an oversized fraction derived from the ductile material;
   withdrawing the pulverized material from the kinetic pulverizer; and
   subjecting the pulverized material to a separation stage to produce a size-reduced stream and an oversized stream, wherein the C&D fines stream comprises gypsum and wherein the kinetic pulverizer is operated such that individual particles of the size-reduced fraction are less than 2 mm in diameter.

2. The process of claim 1, further comprising subjecting the C&D fines stream to a drying stage upstream of the kinetic pulverization stage.

3. The process of claim 1, further comprising subjecting the C&D fines stream to a surface wetting pre-treatment stage upstream of the kinetic pulverization stage.

4. The process of claim 1, further comprising incorporating a friable additive into the C&D fines stream directly into the kinetic pulverizer as a separate stream from the C&D fines stream or into the C&D fines stream upstream of the kinetic pulverization stage such that the friable additive is size reduced and is homogenized with the frangible material to form part of the size-reduced fraction.

5. The process of claim 4, wherein the friable additive comprises at least one of: a porosity agent, a soil additive, a building material additive, a compost additive, peat moss, a glass product additive, and a recycled concrete aggregate (RCA).

6. The process of claim 5, wherein the friable additive is the RCA and the RCA comprises at least 60% by weight of a mixture of the RCA and the size-reduced fraction.

7. The process of claim 4, wherein the friable additive comprises an aggregate material.

8. The process of claim 1, wherein the size-reduced fraction is provided for use as structural or non-structural fill applications.

9. The process of claim 1, wherein the separation stage comprises at least one of: screening, non-ferrous magnetic separation, ferrous magnetic separation, and ductile dust collection.

10. The process of claim 1, wherein the separation stage comprises screening.

11. The process of claim 10, wherein the screening is performed using a vibrating screen.

12. The process of claim 1, further comprising:
    monitoring at least one parameter of: the C&D fines stream, the pulverized material, the oversized stream and/or the size-reduced stream; and adjusting the kinetic pulverization stage based on the at least one parameter.

13. The process of claim 12, wherein the at least one parameter comprises at least one of: an infeed rate of the C&D fines stream, a moisture content of the C&D fines stream, size properties of the C&D fines stream, a composition of the C&D fines stream, size properties of the size-reduced fraction in the pulverized material, a composition of the pulverized material, a flow rate of the oversized stream, a flow rate of the size-reduced stream, a composition of the oversized stream, and a composition of the size-reduced stream.

14. The process of claim 13, wherein adjusting of the kinetic pulverization stage comprises at least one of adjusting a rotation speed of the kinetic pulverizer and adjusting the infeed rate of the C&D fines stream.

15. The process of claim 1, wherein the C&D fines stream comprises drywall.

16. The process of claim 1, wherein the pulverizing rotor assembly comprises a rotatable shaft and rotor arms extending outwardly from the rotatable shaft towards a sidewall of the interior chamber, and the interior chamber comprises a plurality of airflow deflectors, wherein rotating the pulverizer rotor assembly forms a circular airflow that is interrupted by the plurality of airflow deflectors to form the vortices.

17. The process of claim 1, wherein the C&D fines stream comprises at least one of:
   between 50% and 80% aggregate;
   between 1% and 5% cellulose matter;
   between 5% and 15% wood;
   between 5% and 25% of the gypsum;
   between 0.5% and 1% metal; and
   between 1% and 2% plastic.

18. The process of claim 1, further comprising subjecting the pulverized material to a dust collection stage to recover a dust fraction therefrom and produce a dust reduced pulverized stream that is fed to the separation stage to produce the size-reduced stream and the oversized stream.

19. The process of claim 18, wherein at least a portion of the dust fraction is combined with at least a portion of the size-reduced stream.

20. The process of claim 18, wherein the dust collection stage facilitates separation of at least a portion of the ductile material in the oversized fraction.

21. The process of claim 18, wherein the dust collection stage comprises:
   a dust collector coupled with respect to an outlet of the kinetic pulverization stage or with respect to a solids transport device configured for transporting the pulverized material away from the kinetic pulverization stage; and
   a dust recovery unit coupled to the dust collector and configured to cause separation of the dust and transport of the dust fraction from the dust collector to a storage vessel.

22. The process of claim 1, further comprising subjecting a C&D source material to an upstream separation stage to produce the C&D fines stream, wherein the upstream separation stage comprises at least one of: mechanical screening to pre-size the C&D source material to produce the C&D fines stream and manually removing reusable materials from the C&D source material.

23. The process of claim 1, further comprising subjecting a C&D source material to an upstream separation stage to produce the C&D fines stream, wherein the upstream separation stage comprises an upstream dust collection stage to remove at least a portion of the ductile material from the C&D fines stream or the C&D source material.

24. A process for treating construction and/or demolition (C&D) source material, the process comprising:
   subjecting the C&D source material to pre-sorting to form a feedstock that has particle size below 4 inches and includes a frangible material and a ductile material;
   providing a kinetic pulverizer comprising a pulverizing rotor assembly disposed within an interior chamber, wherein the pulverizing rotor assembly is configured to rotate to form vortices that subject the feedstock to self-collisions within the interior chamber;
   subjecting the feedstock to a kinetic pulverization stage wherein the feedstock is fed into the kinetic pulverizer to produce a pulverized material comprising a size-reduced fraction derived from the frangible material and an oversized fraction derived from the ductile material, the pulverizing rotor assembly being operated at a rotation speed of 500 RPM to 1,200 RPM;
   withdrawing the pulverized material from the kinetic pulverizer; and
   subjecting the pulverized material to a screening to produce a size-reduced stream and an oversized stream;
   wherein the feedstock comprises gypsum and wherein the kinetic pulverizer is operated such that individual particles of the size-reduced fraction are less than 2 mm in diameter.

25. The process of claim 24, wherein the screening is conducted such that the size reduced stream is suitable as a fill material.

26. The process of claim 25, wherein subjecting the C&D source material to pre-sorting comprises mechanical screening.

27. The process of claim 25, further comprising subjecting the feedstock to a pre-treatment stage prior to subjecting the feedstock to the kinetic pulverization stage, wherein the pre-treatment stage comprises crushing or grinding upstream of the kinetic pulverization stage to reduce the particle size to below 4 inches.

28. The process of claim 25, wherein the feedstock comprises a source separated material having a frangible component comprising the frangible material coupled to a ductile component comprising the ductile material.

29. The process of claim 28, wherein the source separated material comprises gypsum drywall.

30. The process of claim 29, wherein the size-reduced fraction comprises a pulverized gypsum product and wherein the pulverized gypsum product is configured for use as an agriculture amendment, a soil amendment, a cement mixture additive, or in the production of drywall panels.

\* \* \* \* \*